United States Patent [19]
Hirai et al.

[11] Patent Number: 5,531,049
[45] Date of Patent: *Jul. 2, 1996

[54] ROOF MOUNTED LIGHT TRANSMITTING FRAME

[75] Inventors: Takashi Hirai; Yoshio Kaneko, both of Tokyo, Japan

[73] Assignee: Hirai Engineering Corporation, Tokyo, Japan

[ * ] Notice: The term of this patent shall not extend beyond the expiration date of Pat. No. 5,406,936.

[21] Appl. No.: 208,249

[22] Filed: Mar. 9, 1994

Related U.S. Application Data

[62] Division of Ser. No. 598,633, filed as PCT/JP90/00223 Feb. 23, 1990, Pat. No. 5,406,936.

[30] Foreign Application Priority Data

Mar. 30, 1989 [JP] Japan ..................................... 1-76703

[51] Int. Cl.⁶ .................................................. E04B 7/18
[52] U.S. Cl. .............................................. 52/200; 126/621
[58] Field of Search ............................... 52/200; 126/621, 126/622, 623

[56] References Cited

U.S. PATENT DOCUMENTS

| | | |
|---|---|---|
| 4,194,325 | 3/1980 | Chalpin, Jr. . |
| 4,223,667 | 9/1980 | Paymal . |
| 4,228,791 | 10/1980 | Hirai et al. . |
| 4,233,085 | 11/1980 | Roderick et al. . |
| 4,336,413 | 6/1982 | Tourneux . |
| 4,426,813 | 1/1984 | Buzzi, Jr. . |
| 4,477,248 | 10/1984 | Lacey . |
| 4,636,577 | 1/1987 | Peterpaul . |
| 4,638,613 | 1/1987 | Tönsmann . |
| 4,680,905 | 7/1987 | Rockar . |
| 4,936,063 | 6/1990 | Humphrey . |

FOREIGN PATENT DOCUMENTS

| | | |
|---|---|---|
| 062582 | 10/1982 | European Pat. Off. . |
| 2268133 | 12/1975 | France . |
| 2401290 | 4/1979 | France . |
| 2546552 | 11/1984 | France . |
| 55-6110 | 6/1978 | Japan . |
| 56-064251 | 10/1979 | Japan . |
| 56-85648 | 12/1979 | Japan . |
| 57-148142 | 3/1981 | Japan . |
| 1-275847 | 12/1988 | Japan . |
| 2-24444 | 2/1989 | Japan . |
| 2000860 | 1/1979 | United Kingdom . |
| WO81/01189 | 4/1981 | WIPO . |
| WO88/08062 | 10/1988 | WIPO . |

*Primary Examiner*—Creighton Smith
*Attorney, Agent, or Firm*—Lowe, Price, LeBlanc & Becker

[57] ABSTRACT

A roof mounted light transmitting frame has a pair of longitudinal sash members. A light-transmitting sheet support sash member is mounted obliquely along the inner surface of each longitudinal sash member such that the distance between its front end and the lower edge of the longitudinal sash member is larger than the distance between its rear end and the lower edge of the longitudinal sash member. A lower horizontal sash member with a vertical support member is mounted between front ends of the light-transmitting sheet support sash members. An upper horizontal sash member is mounted between rear ends of the light-transmitting sheet support sash members. A light-transmitting sheet is mounted between the light-transmitting sheet support sash members, and the upper and lower horizontal sash members. A recess is longitudinally formed on the lower horizontal sash member to receive an upper horizontal sash member of the next frame.

20 Claims, 31 Drawing Sheets

FIG. 16
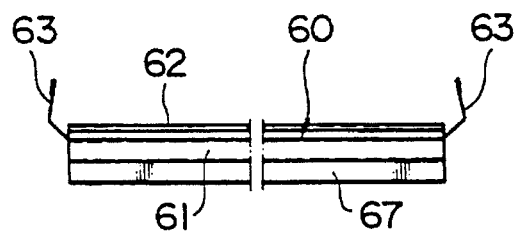
FIG. 17
FIG. 18
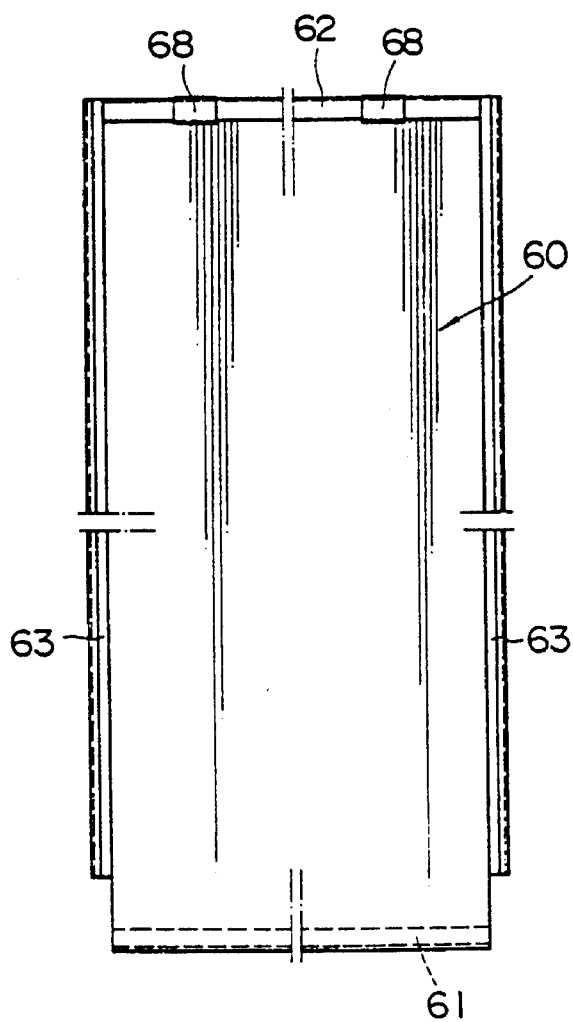
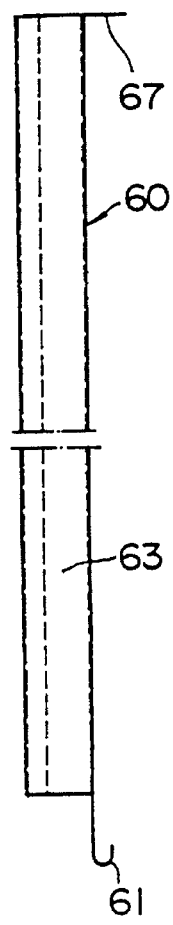

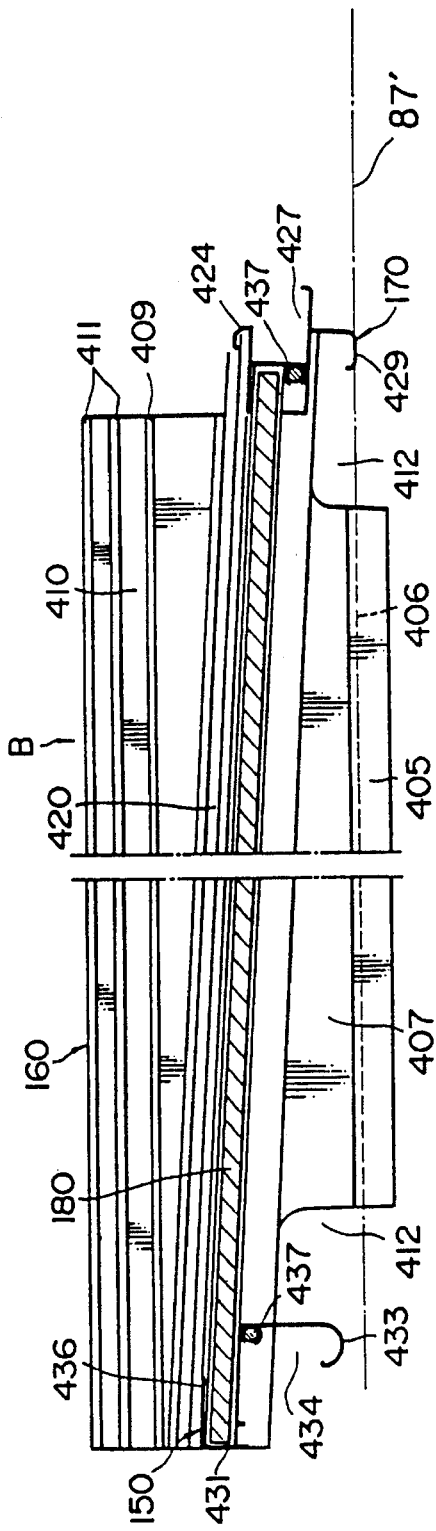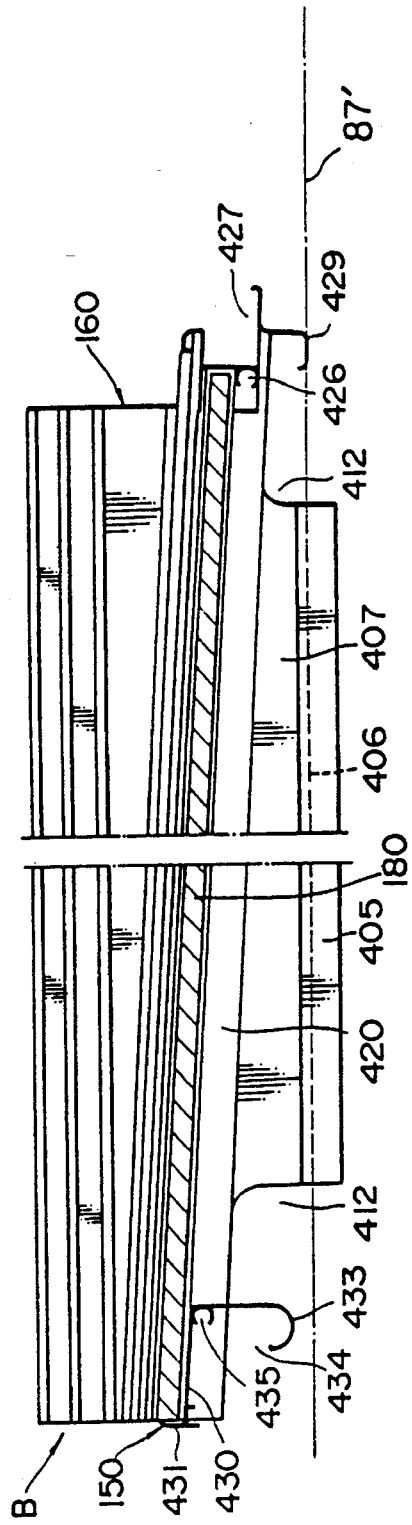

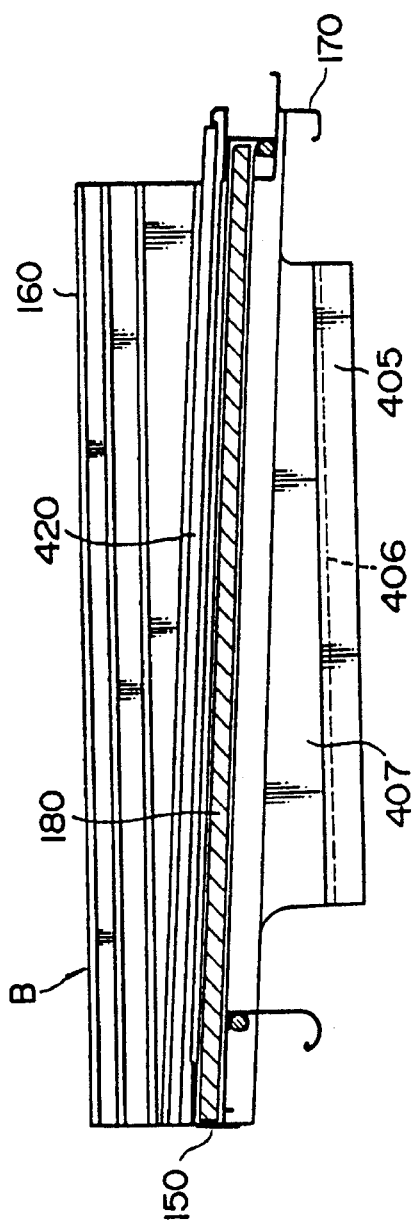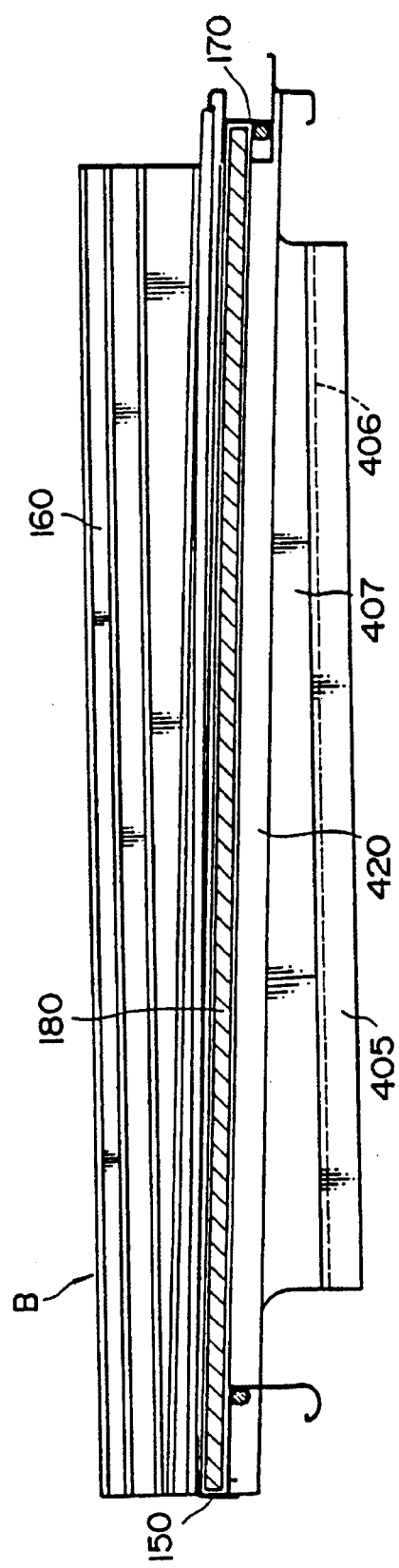

ROOF MOUNTED LIGHT TRANSMITTING FRAME

This application is a division of application Ser. No. 07/598,633, filed as PCT/JP90/00223 Feb. 23, 1990, now U.S. Pat. No. 5,406,936.

FIELD OF THE ART

This invention relates to a roof structure for collecting solar energy.

BACKGROUND ART

There are two types of roof-mounted known structures for collecting solar energy, one, in which a heating medium sealed in a transparent sheet is heated by means of solar energy to make use of the resultant heat; and another, in which a solar energy collection roof member made of amorphous silicon or crystalline silicon is mounted on the back side of a light transmitting sheet.

However, when the entire surface of a roof is covered with solar energy collection members, the cost goes up and a large number of solar energy collection roof members of different dimensions are required used in combination with each other to correspond to the size of the roof surface. Also, the roof increases the weight, so that rafters and sheathing boards have to bear substantial weight. Since each of these conventional structures is complicated in structure and includes a large number of members, the erection of such conventional roof mounted roof structures is troublesome, and the correction of dimensional errors is troublesome, so that it has been impossible to provide a roof with a sufficient surface for use in collecting of solar energy.

DISCLOSURE OF THE INVENTION

The objects of the present invention are to provide a solar energy collecting roof structure, which can accommodate an error in dimension between a roof and the solor energy collecting roof member due to thermal expansion, which is simple to erect so as to be capable of easily providing a large-scaled energy collecting structure, which does not need to cover the entire roof surface with light-transmitting frames, which is arranged to accomodate the dimensions of a portion of the roof for collecting solar energy according to a desired value, which permits the erection of a structure using standard-sized light-transmitting frames, which reduce the weight on the roof itself and avoids burdening rafters or sheathing boards with excessive weight, and which has an excellent external appearance.

In order to attain the above objects, a solar energy collection structure according to the present invention is mounted on a roof surface having an eaves part and a gable part covered with usual roof members, and a predetermined part enclosed by overlying roof members and covered with solar energy collection members.

In accordance with the invention, a roof mounted light transmitting frame has a pair of left and right longitudinal sash members. A light-transmitting sheet support sash member is mounted along the inner surface of each longitudinal sash member. A lower horizontal sash member having a vertically disposed support member, which is preferably J-shaped, is mounted between the front ends of the light-transmitting sheet support sash members. An upper horizontal sash member is mounted between the rear ends of the light-transmitting sheet support sash members. The light-transmitting sheet is mounted inside a space defined by the light-transmitting sheet support sash members, and the upper and lower horizontal sash members. Each light-transmitting sheet support sash member is mounted obliquely to the longitudinal sash member such that the distance between its front end and the lower edge of the longitudinal sash member is larger than the distance between its rear end and the lower edge of the longitudinal sash member. A recess is longitudinally formed on the lower horizontal sash member adapted to receive the upper horizontal sash member.

According to one aspect of the invention, the lower horizontal sash member has a light-transmitting sheet contact wall with a height substantially equal to the thickness of the light-transmitting sheet. The lower sash member also has a light-transmitting sheet mounting piece and a light-transmitting sheet press piece disposed at each end of the light-transmitting sheet contact wall.

In accordance with another aspect of the invention, the upper and lower horizontal sash members each has one or more threaded portions adapted to receive a threaded fastener for mounting the sash member. Each longitudinal sash member and each light-transmitting sheet support sash member has one or more borings adapted to allow a threaded portion of a fastener to engage with each threaded portion or portions of the upper and lower horizontal sash members. Preferably, the engagement of the threaded fasteners forces the frame into a rectangular shape. It is also preferred that each longitudinal sash member have one boring at its front and rear end. The distance between the front end boring and the lower edge of the longitudinal sash member is different, and preferably larger, than the distance between the rear end boring and the lower edge of the longitudinal sash member.

According to still further aspects of the invention, the light-transmitting sheet support sash member may have a C or U shaped portion, one end of which can be used for mounting the light transmitting sheet. Preferably the longitudinal sash members include a drain groove and a vertical water proof portion disposed above the groove. The light-transmitting sheet support sash members have a drain cavity and the upper horizontal sash member includes a drain groove and a flashing portion. It is also preferred that the lower horizontal sash member include a waterproof gutter. The flashing portion of the upper horizontal sash member of one frame forms a weather seal against the lower horizontal sash member of another frame. The combination of the drains, gutters and flashing provide both a seal against the weather and a rain removal system.

Preferably the J-shaped portion of the lower horizontal sash member forms the recess in the lower horizontal sash member. It is also beneficial for each longitudinal sash member to have a lower vertical portion which is adapted to fit in a groove of a support member located on the roof. The longitudinal sash member drain groove is disposed above the lower vertical member. The upper horizontal sash member can also be connected to the support member.

According to the solar energy collection structure of the present invention, since the usual roof members occupy the eaves part and the gable part, and the solar energy collection members are laid on the predetermined part enclosed with the roof members, it is not necessary to roof the entire cover surface with the lighting frames. Consequently the dimension of the roof portion for collecting the solar energy are defined according to a desired value, the erection of the roof structure is done with the standard-sized light-transmitting frames, and the weight of the roof is reduced to avoid burdening the rafters or the sheathing boards.

Also, the roof mounted solar energy collection structure has a beautiful external appearance and offers a wide variety of different forms.

BRIEF DESCRIPTION OF THE DRAWINGS

FIG. 16 is a front view showing an eaves waterproof sheet:

FIG. 17 is a plan view showing the eaves waterproof sheet of FIG. 16;

FIG. 18 is a side view showing the eaves waterproof sheet of FIG. 16;

FIG. 47 is a longitudinal sectional view showing the side of the light-transmitting frame;

FIG. 48 is a longitudinal sectional view showing the center of the light-transmitting frame;

FIGS. 53 and 54 are longitudinal sectional views showing the light-transmitting frames different from each other in length, respectively.

BEST MODE FOR CARRYING OUT THE INVENTION

Figure 1:
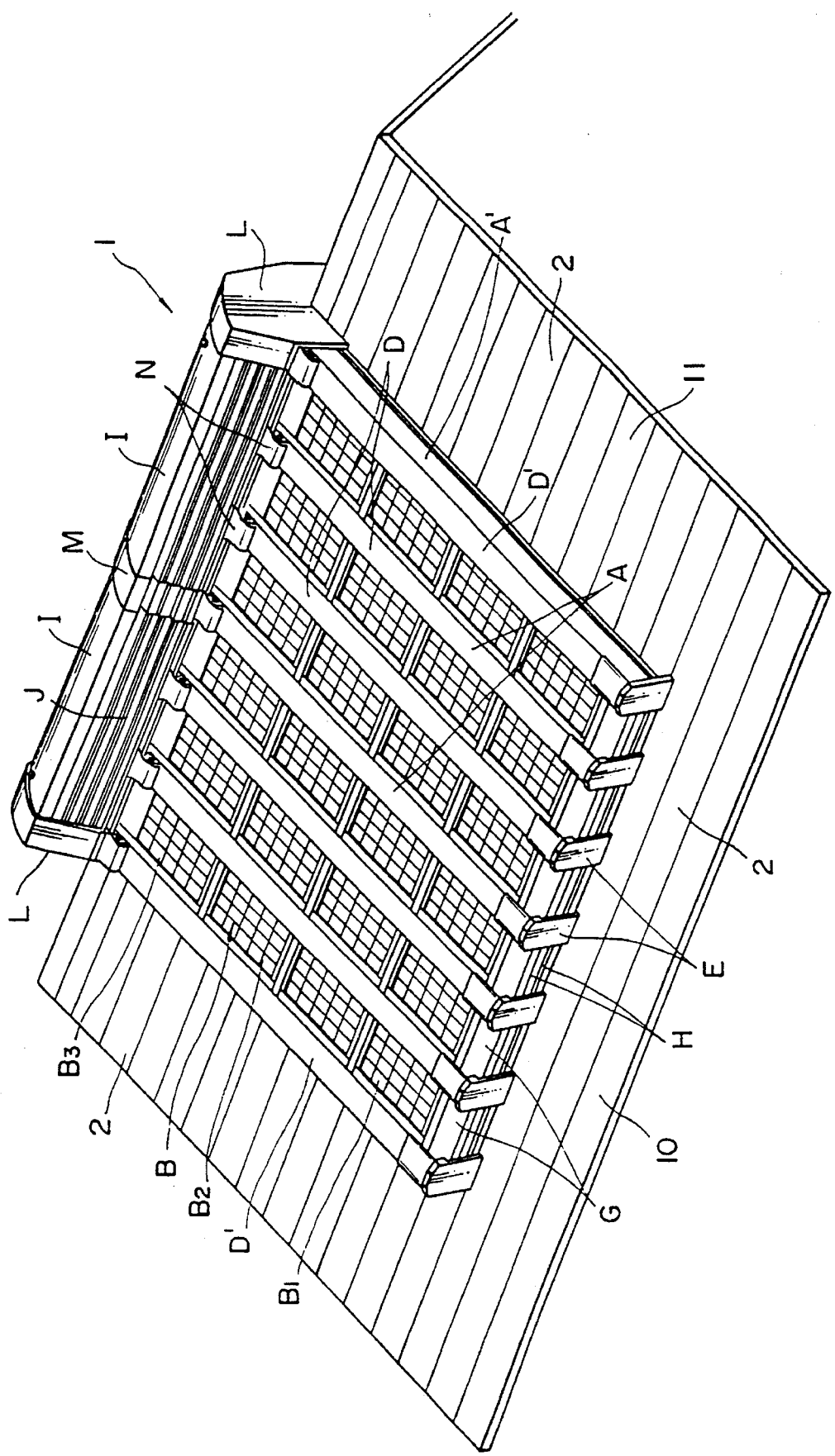
FIG. 1 is a perspective view showing an embodiment the present invention.

FIG. 1 is a perspective view showing an embodiment of a complete roof-mounted structure according to the present invention. In FIG. 1, reference numeral 1 designates a gable style roof having inclined surfaces respectively extending from a ridge toward opposite sides thereof, wherein an eaves part and a gable part of one inclined surface of the gable roof 1 are roofed with roof members 2 made of metal sheets for use in lateral roofing or elongate metal sheets provided with dutch lap-like pointed joints, and a part of one inclined surface enclosed by overlying roof members 2 is roofed with light-transmitting frames B constituting solar energy collection members.

Reference symbol A designates an intermediate connecting member, and B a light-transmitting frame mounted between the adjacent intermediate connecting members A, A serving as the connecting member. A photoelectric generating element for transducing solar energy into electric energy is provided under the light-transmitting frame.

The light-transmitting frame B consists of an eaves-side light-transmitting frame B1, an intermediate lighting frame B2 and a ridge-side light-transmitting frame B3.

Reference symbol A' designates a side connecting member, and on one side of the side connecting member A' are mounted the overlying roof members 2, instead of the light-transmitting frames B.

Reference symbol D designates an intermediate connecting member cover mounted on the intermediate connecting member A, and D' a side connecting member cover mounted on the side connecting member A'. Each of the connecting member covers D, D' is approximately equal in length with the light-transmitting frame B.

Reference symbol E designates a dustproof cap, G an eaves-side cover used for a prevention of dust and an inspection of a wiring, and H an eaves-side intake port provided in the eaves cover G.

Reference symbol I designates a ridge cover, J a ridge side face member mounted on the side face of the ridge cover I, L a ridge end member mounted to an end of the ridge cover I, M a ridge cover connecting member for interconnecting the ridge covers I, I, and N a ridge mounting member.

Figure 2:
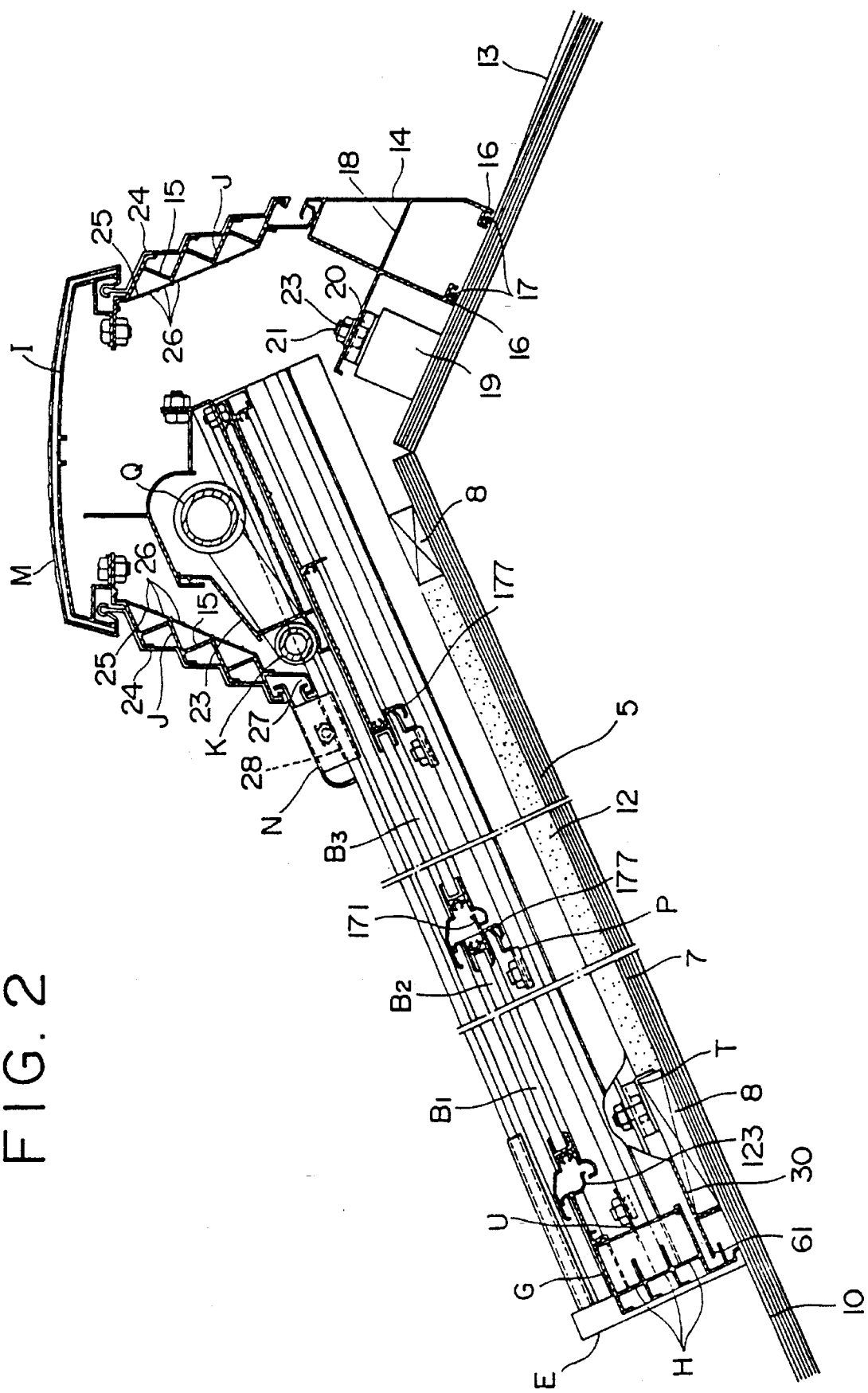
FIG. 2 is a fragmentary longitudinal sectional view illustrating an embodiment of the present invention.

FIG. 2 is a fragmentary longitudinal sectional view showing roof with a solar energy collection equipment.

Figure 3:
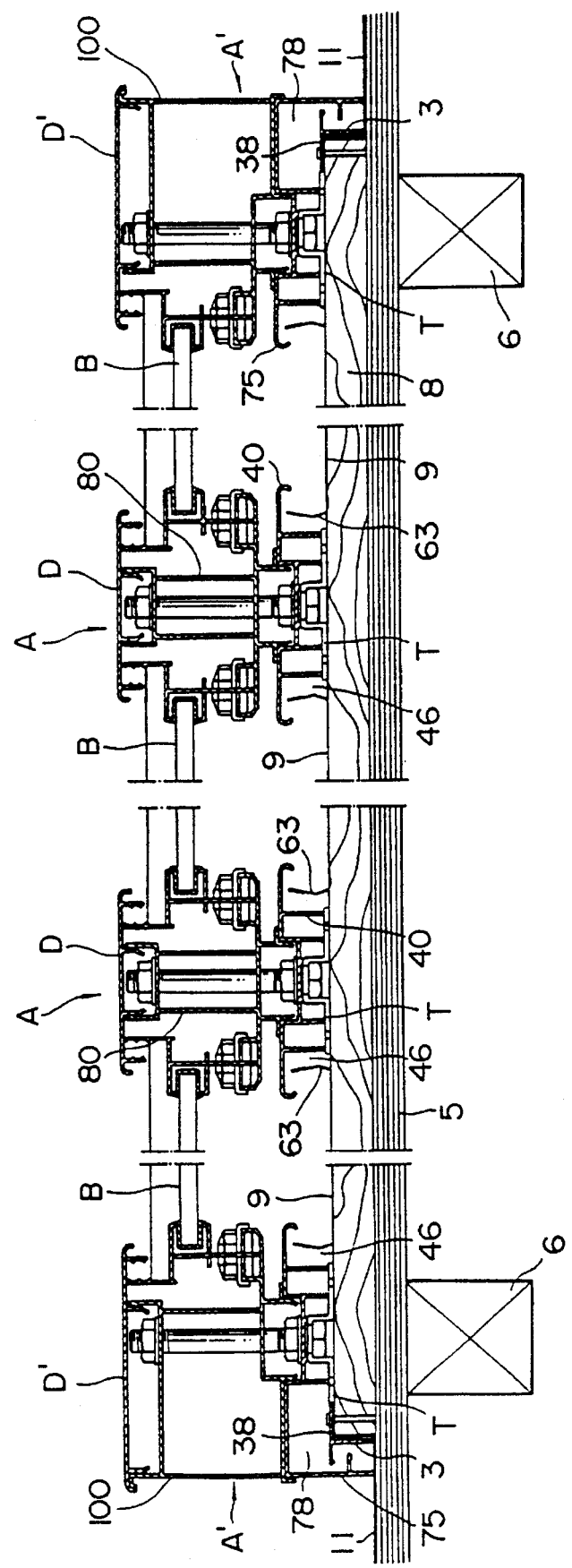
FIG. 3 is a fragmentary cross-sectional view illustrating the present invention.

In FIG. 2, reference numeral 5 designates a roof sheathing roof board, which is laid on rafters 6 (See FIG. 3). The sheathing board 5 is covered with a building paper 7, and a plurality of crosspieces 8 are disposed on the building paper 7 except the eaves part and the gable part as extending in parallel with the ridge part. On these crosspieces are mounted waterproof sheets 9 successively interconnected in the lateral direction by the respective intermediate connecting members A, as shown in FIG. 3.

The crosspiece 8 closest to the eaves is made wider than the other crosspieces 8.

Also, the roof members 2 consisting of eaves-side metal roof sheets 10 are provided on the eaves-side building paper 7, and the roof members 2 consisting of gable-side metal roof sheets 11 are provided on the gable-side building paper 7.

Each waterproof sheet 9 is provided at both sides with upright engaging waterproof walls 63 and at the eaves side with a downward bent eaves throating portion 61.

A heat-insulating material 12 (such as glass wool, foaming resin or the like) occupies the space between adjacent crosspieces 8 at the underside of each waterproof sheet 9.

The eaves cover G, the eaves-side light-transmitting frame B1, the intermediate light-transmitting frame B2 and the ridge-side light-transmitting frame B3 are successively interconnected from the eaves side toward the ridge on a plurality of waterproof sheets 9 successively interconnected in the lateral direction by the respective intermediate connecting members A.

Reference symbol P designates a light-transmitting frame fitting for mounting the light-transmitting frame B, and U a porous sheet mounted to the eaves cover G. Reference numeral 30 designates an eaves support member.

Each dustproof cap E closes an eaves-side end of each intermediate connecting member A and that of each side connecting member A', as shown in FIG. 1.

Reference symbol K designates a sprinkling pipe connected to a cleaning device Q used for melting snow on the lighting frame.

The building paper 7 laid on the sheathing board 5 on the other inclination surface of the gable roof 1 is covered with metal roof sheets 13. A ridge end face member 14 is mounted on the metal roof sheet 13 close to its ridge-side end, and the ridge side face member J having ventilating openings 15 is engaged with the upside of the ridge end face member 14. The ridge cover I is provided across a portion between an upper end of the ridge side face member J and an upper end of another ridge side face member J mounted on a ridge-side end of the ridge-side lighting frame B3.

The ridge end face member 14 has waterproof material fit grooves 16 respectively sealed with packing 17. After the grooves 16 are sealed with the packing 17, the ridge end face member 14 is installed on the metal roof sheets 13 along the ridge-side edge thereof, and then fixed to the sheathing roof board by the use of bolts 21, which are inserted through bolt holes of a connection plate 18 and also through fittings 20 mounted to a horizontal sash member 19, and nuts 23.

Reference numeral 22 designates a ridge adjusting member mounted to the upside of the ridge-side end of the ridge-side light-transmitting frame B3, and on which the sprinkling pipe K is placed. Reference numeral 24 designates a ridge side face connecting member for closing a connecting portion of the adjacent ridge side face members J and engaging the ridge cover connecting member M, and 25 a ridge waterproof sheet having air outlets 26 and provided in engagement with the inside of the ridge side face member J.

The ridge side face member J is formed with a mounting groove 27, with which a connector member 28 is brought into engagement. Each previously mounted ridge mounting member N is fitted to the connector member 28, and thence mounted thereto by way of bolts and nuts, so that the ridge cover I is mounted to the intermediate connecting member covers D through the ridge side face member J.

FIG. 3 is a fragmentary cross-sectional view showing the roof with the solar energy collection equipment. In FIG. 3, the waterproof sheets 9 are successively interconnected in the lateral direction by bringing the engaging waterproof walls 63 of the waterproof sheets 9 into engagement with the intermediate connecting members A, and the light-transmitting frames B are covered above the waterproof sheets 9 at an interval when the opposite sides of each light-transmitting frame B front on the corresponding intermediate connecting members A.

The side connecting member A' has an inside end facing the end of the waterproof sheet 9 and also brought into engagement with the end of the light-transmitting frame B and an outside end, to which the roof sheets 2 are mounted.

The intermediate connecting member cover D is fittingly mounted to each intermediate connecting member A, and the side connecting member cover D' is fittingly mounted to each side connecting member A'.

The intermediate connecting member A is composed of a lower-part connecting member 40 for interconnecting the waterproof sheets 9 and an upper-part connecting member 80 for interconnecting the light-transmitting frames B. The side connecting member A' is composed of a lower side connecting member 75 and an upper side connecting member 100.

Figure 4:
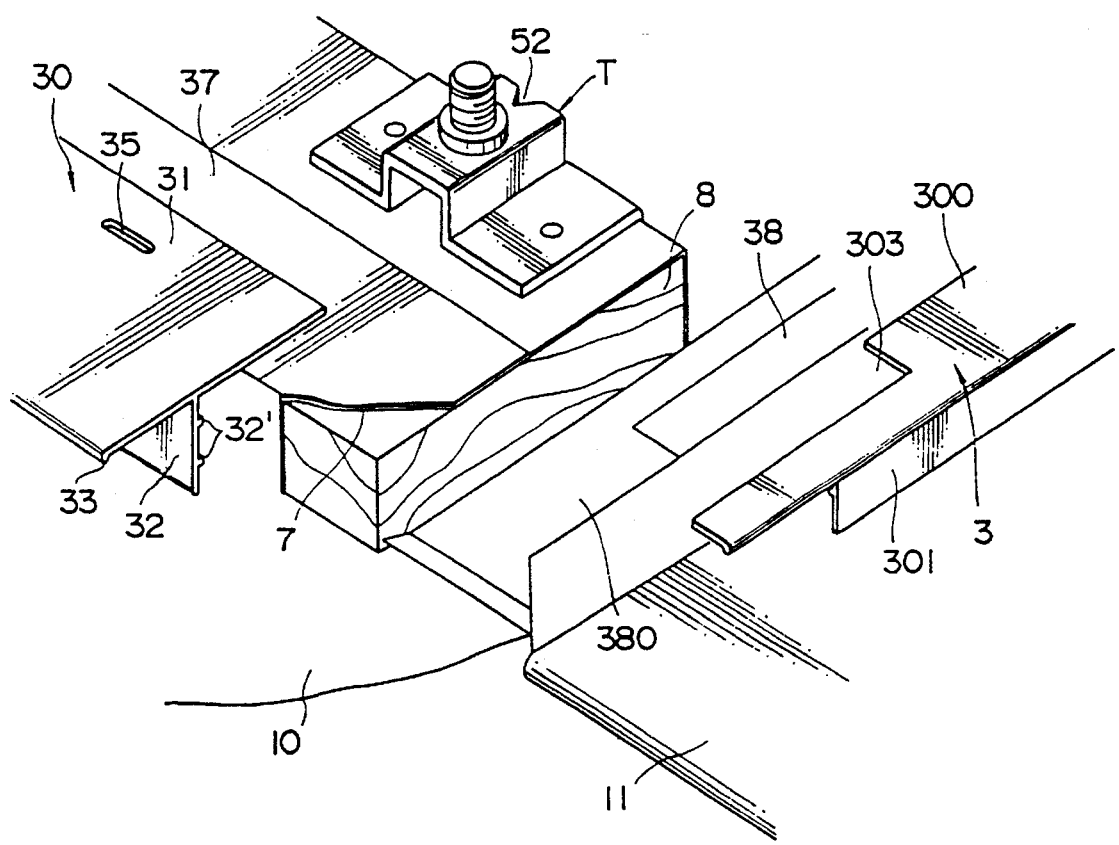
FIG. 4 is a fragmentary perspective view showing the present invention before an eaves support member and a side support member are mounted to a crosspiece.
Figure 5:
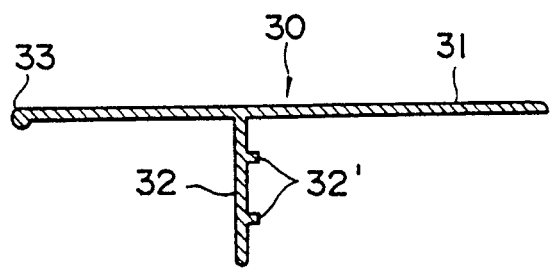
FIG. 5 is a cross-sectional view showing the eaves support member.
Figure 6:
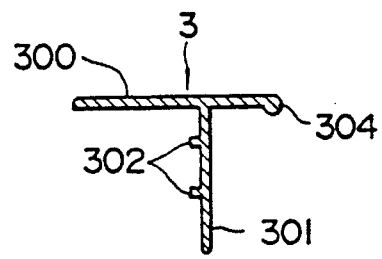
FIG. 6 is a cross-sectional view showing the side support member.

FIGS. 4 shows a way of mounting the eaves support member 30 and a side support member 3. The eaves support member 30 has a substantially T-like shape in cross-section as shown in FIG. 5 and has a horizontal portion 31, a wall 32 extending downward from the underside of the horizontal portion 31, and several rows of throatings 32' formed on the back surface of the wall 32.

A slot 35 having a long axis extending parallel to the eaves line is bored in the horizontal portion 31 of the eaves support member 30, and an eaves-side end of the horizontal portion 31 is formed into a waterproof sheet engaging portion 33.

Also, a stair-like engaging step portion 37 is formed at a ridge-side end of the eaves-side metal roof sheet 10.

The eaves support member 30 is mounted to the crosspiece 8 located closest to the eaves as follows:

Firstly, the ridge-side edge of the building paper 7 below the eaves metal sheet 10 is bent upward to be fixed to the upper side of the crosspiece 8, and then the engaging step portion 37 of the eaves-side metal roof sheet 10 is mounted to the upper side of the building paper 7 fixed to the upside of the crosspiece 8. Subsequently, the horizontal portion 31 of the eave support member 30 is mounted on the engaging step portion 37 of the eaves-side metal roof sheet 10, and then the eaves support member 30 is fixed to the crosspiece 8 closest to the eaves with a nail or the like by making use of the slot 35 provided in the horizontal portion 31 of the eaves support member 30.

Then, a connecting member fitting T having an eye measurement guide notch portion 52 is mounted to the ridge side of the crosspiece 8 closest to the eaves.

Figure 7:
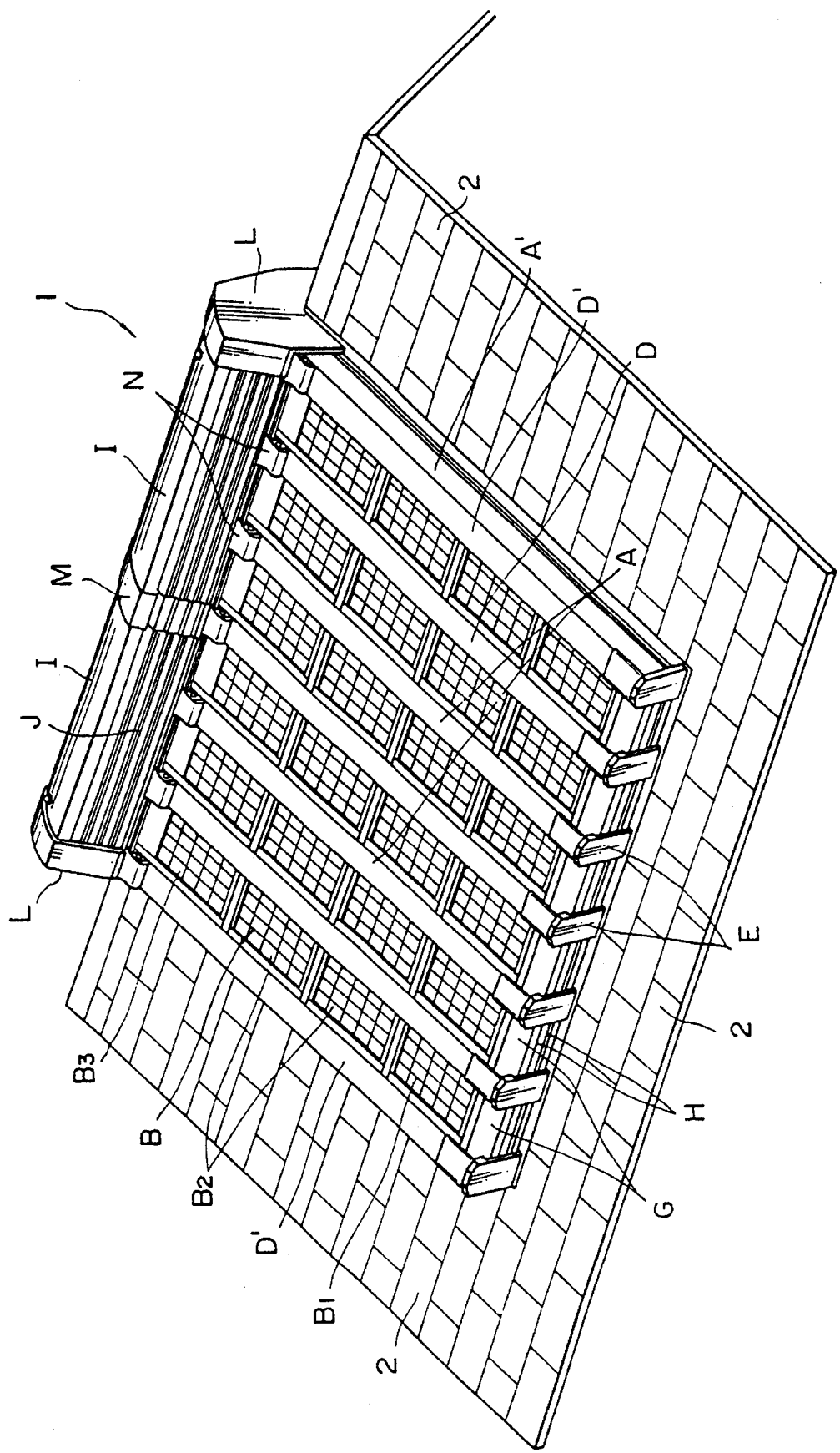
FIG. 7 is a perspective view showing another embodiment of the present invention.
Figure 8:
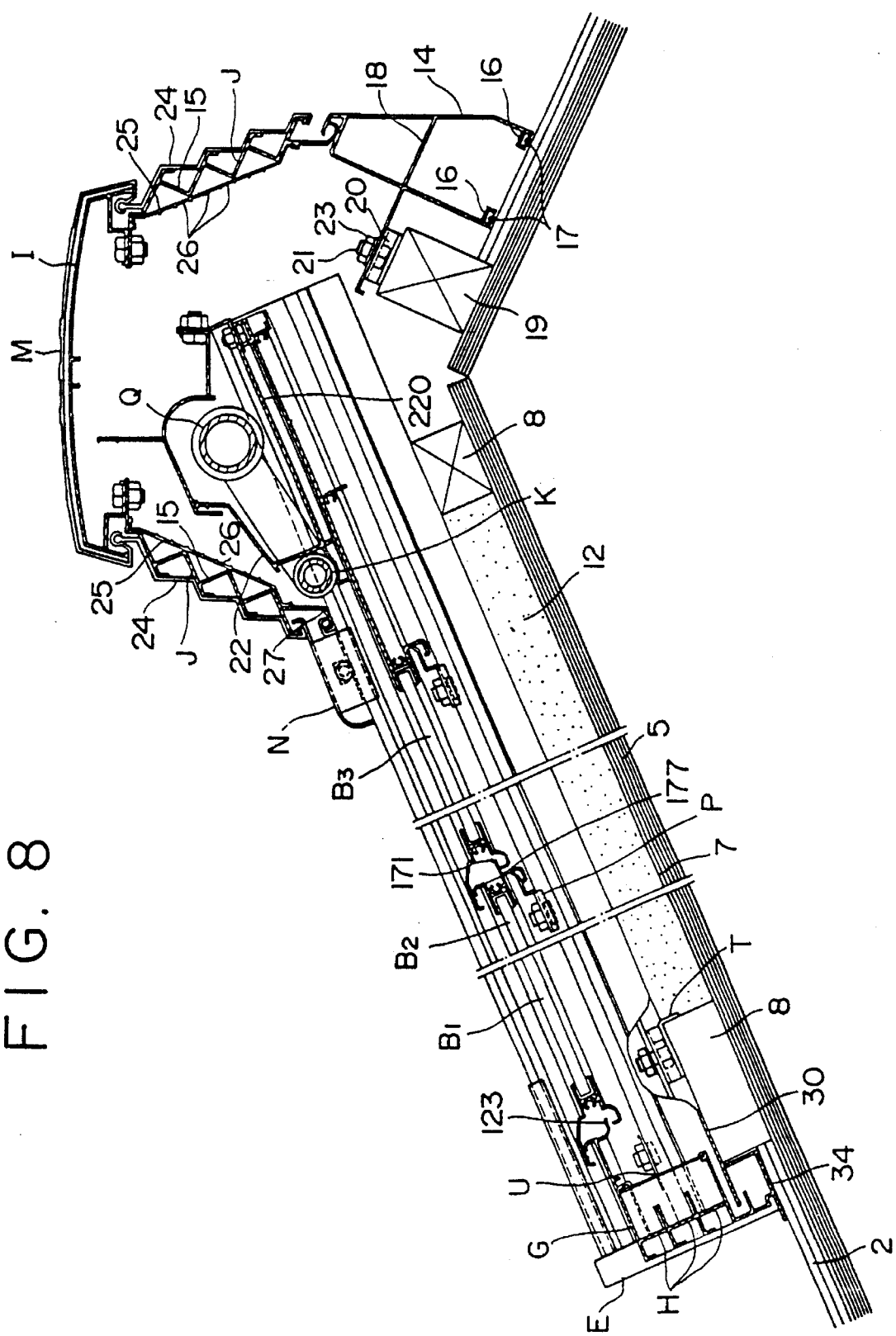
FIG. 8 is a fragmentary longitudinal sectional view showing another embodiment of the present invention.

As shown in FIG. 7, the side support member 3 has a horizontal overhang surface 300, a side wall 301 shorter than the horizontal overhang surface 300 and extending downward from the underside of the horizontal overhang surface 300 at its eaves side, and several rows of throating projections 302 provided on the inner surface of the side wall 301. The horizontal overhang surface 300 has an eaves-side inner end formed with a notch 303 and an outer edge formed into a large-diameter engaging portion 304.

Also, a side portion of the gable-side metal roof sheet 11 is provided with a waterproof rising wall 38 brought into engagement with an end face of the crosspiece 8. The waterproof rising wall 38 is also formed with a fit notch portion 380 in a position corresponding to the notch 303. Then, the waterproof rising wall 38 of the gable-side metal roof sheet 11 and the side support member 3 are mounted to the upside of the end of the crosspiece 8 so that the notch 303 and the fit notch portion 380 are fitted to a ridge-side corner of the eaves support member 30.

FIGS. 8 through 14 show another embodiment of the roof with the solar energy collection equipment according to the present invention, respectively, wherein the gable part and the eaves part of the roof are roofed with flat roof members 2 such as asbestos cement and asphalt roofing tile.

Figure 9:
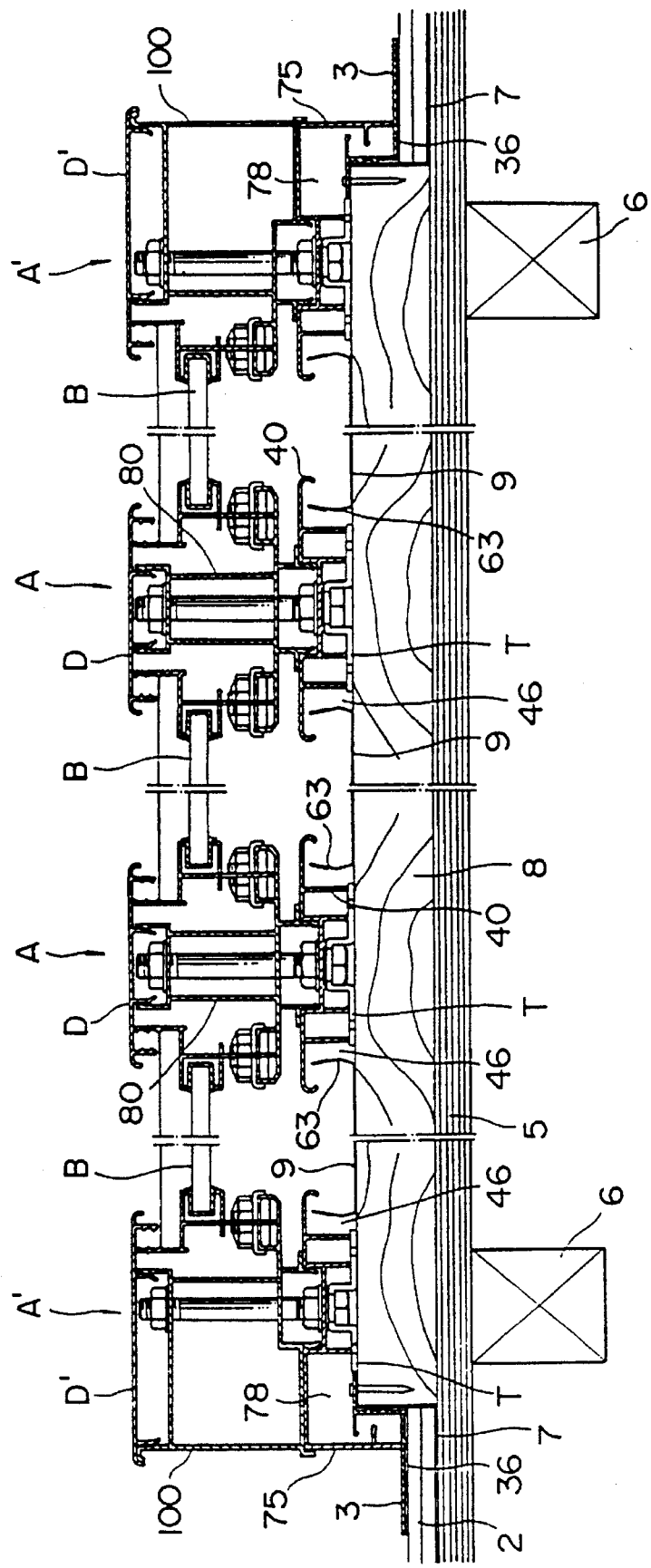
FIG. 9 is a fragmentary cross-sectional view showing another embodiment of the present invention.
Figure 12:
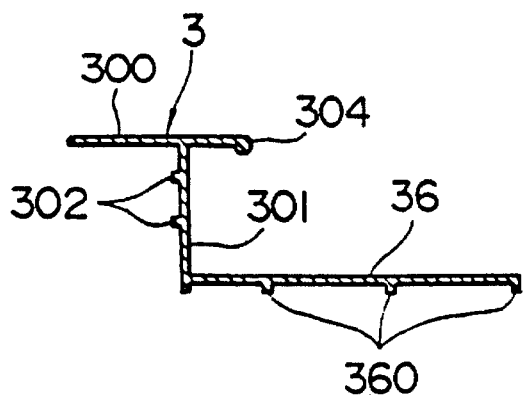
FIG. 12 is a cross-sectional view showing the side support member.

As shown in FIG. 9, the eaves support member 30 is fixed to the crosspiece 8 closest to the eaves so that the eaves support member 30 presses down the upside of each eaves-side roof member 2. As shown in FIG. 12, a front end of an eaves roof member pressing waterproof portion 34 extending from a lower end of the wall 32 of the eaves support member 30 is overhung to be located closer to the eaves than the end of the horizontal portion 31, and a plurality of throating projection rows 340 parallel to each other are formed on the underside of the front end and intermediate portions of the eaves roof member pressing waterproof portion 34, whereby the waterproof structure for the roof members 2 is constituted.

Figure 10:
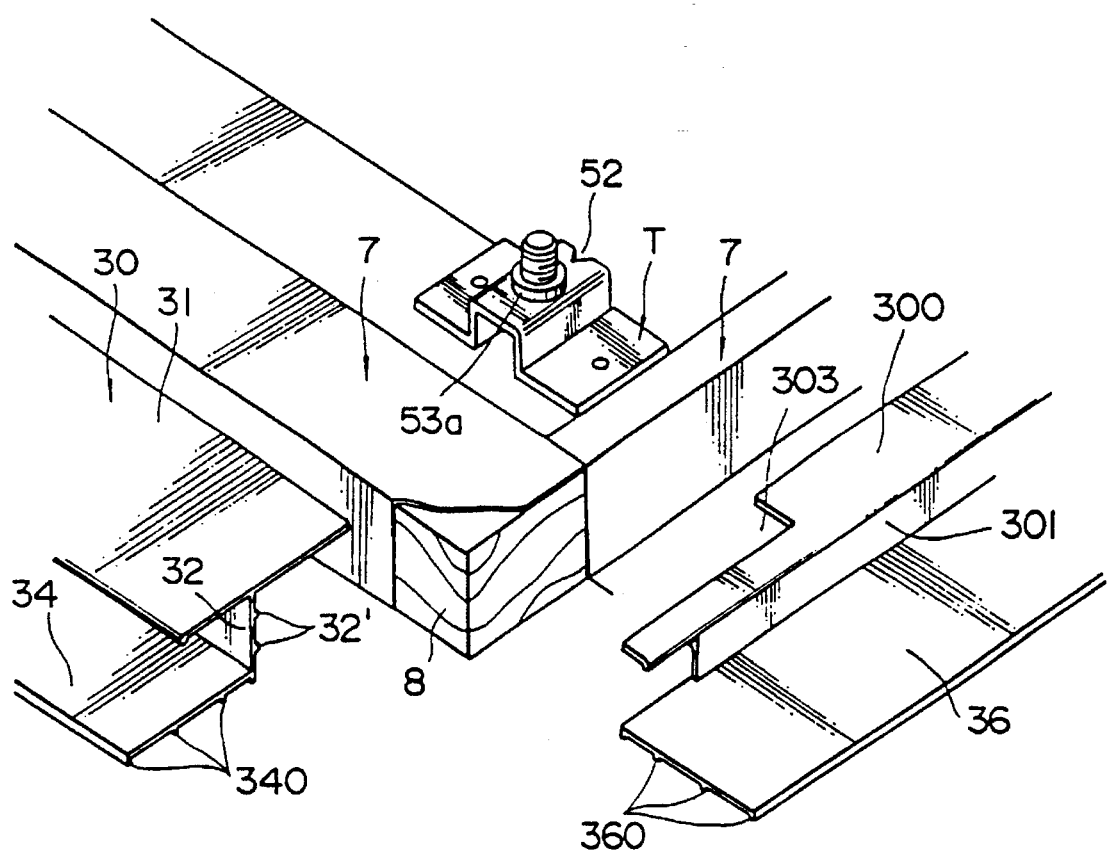
FIG. 10 is a fragmentary perspective view showing another embodiment of the present invention before an eaves support member and a side support member are mounted to a crosspiece.
Figure 14:
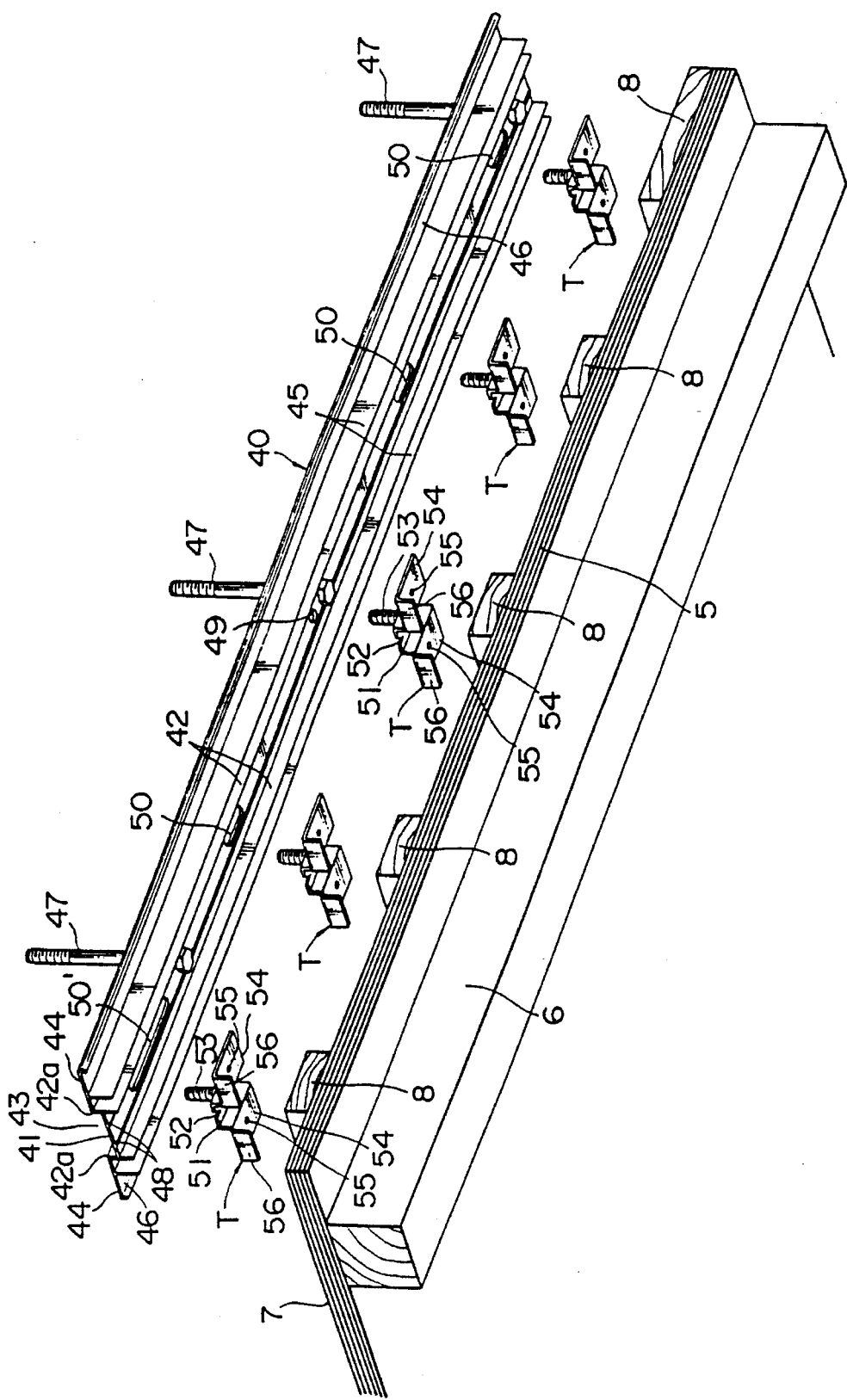
FIG. 14 is an exploded rear perspective view showing the lower-part connecting member, a connecting member fitting and a sheathing roof board.

Also, as shown in FIG. 10, the side support member 3 is fixed to the crosspiece 8 so that the side support member 3 presses down the upside of each gable-side roof member 2. As shown in FIG. 14, the side support member 3 has a side roof member pressing waterproof portion 36 extending from the lower end of the side wall 301 toward the gable side such that a front end of the side roof member pressing waterproof portion 36 is overhung to be located closer to the gable than a front end of the horizontal overhang surface 300, and a plurality of throating projection rows 360 parallel to each other are formed on the underside of the front end and intermediate portions of the side roof member pressing waterproof portion 36, whereby the waterproof structure for the roof members 2 is constituted.

To mount the eaves support member 30 and the side support member 3. The ridge-side edge of the eaves-side building paper 7 is bent upward to be fixed to the upside of the crosspiece 8 located closest to the eaves, and the roof members 2 are mounted to the upside of the building paper 7. Subsequently, the horizontal portion of the eaves support member 30 is mounted to the upside of the crosspiece 8, and then the roof members 2 are pressed down by the eaves roof member pressing waterproof portion 34 from above to constitute the waterproof structure for the eaves portion.

Also, the side edge of the gable-side building paper 7 is similarly bent upward to be fixed to the side of each crosspiece 8, and the upside of the building paper 7 is covered with the roof members 2. Subsequently, the horizontal overhang surface 300 of the side support member 3 is mounted to the upper side of the side of the crosspiece 8 so as to be orthogonal to the crosspiece 8, and then, the roof members 2 are pressed down by the side roof member pressing waterproof portion 36 from above to constitute the waterproof structure for the side.

Figure 15:
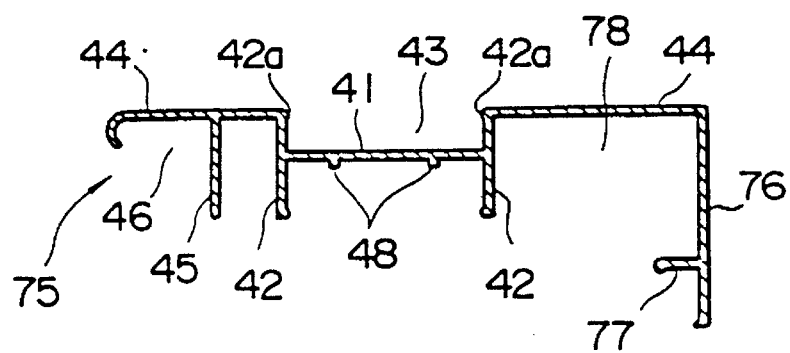
FIG. 15 is a cross-sectional view showing a lower side connecting member.

As shown in FIGS. 15 and 17, the lower-part connecting member 40 of the intermediate connecting member A for interconnecting the waterproof sheets 9 has a horizontal fixing portion 41, a pair of vertical walls 42 provided at opposite ends of the horizontal fixing portion 41 as extending from the horizontal fixing portion 41 upward and downward, and engaging projections 42a respectively provided on inner side portions of upper ends of the vertical walls 42, wherein a recess 43 is defined by both vertical walls 42 and the upside of the horizontal fixing portion 41.

The lower-part connecting member 40 further has overhang portions 44 respectively projecting outward from the upper ends of the vertical walls 42 rightward and leftward and having the downward curved tips, and a downward piece 45 extending downward from the underside of each overhang portion 44, wherein a wide waterproof sheet inserting portion 46 is defined by the outer surface of the downward piece 45 and the underside of the overhang portion 44.

As shown in FIG. 16, the horizontal fixing portion 41 of the lower-part connecting member 40 is provided with connection bolts 47 for fixing the upper-part connecting member 80, and the underside of the horizontal fixing portion 41 is formed with contact pieces 48 mounted to the upside of the connecting member fitting T which will be described later.

A circular fixing hole 49 is bored in the substantially longitudinal center of the horizontal fixing portion 41 of the lower-part connecting member 40, and fixing slots 50 having long axes extending parallel to a line connecting the eaves and the ridge are bored at intervals in portions at the ridge side and the eaves side of the circular hole 49.

Among the slots 50 of the lower-part connecting member 40, a slot 50' closest to the ridge is formed longer in long axis than the other slots 50.

Figure 11:
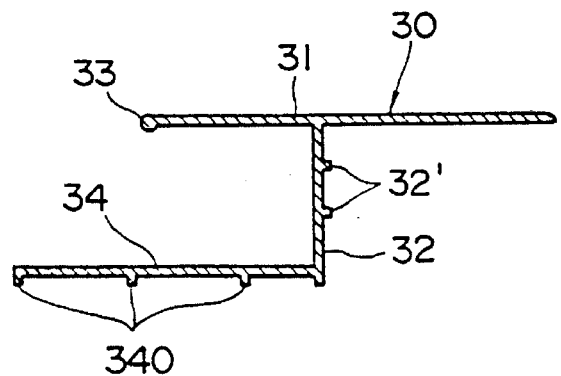
FIG. 11 is a cross-sectional view showing the eaves support member in another embodiment of the present invention.
Figure 13:
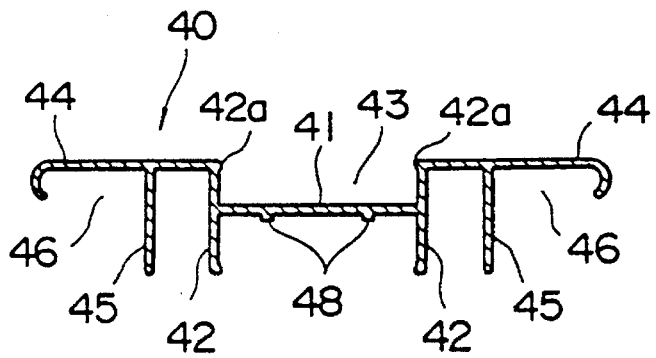
FIG. 13 is a cross-sectional view showing a lower-part connecting member.

The connecting member fitting T has an upward protuberant portion 51 fitted to the underside of the horizontal fixing portion 41 of the lower-part connecting member 40, and an eye measurement guide notch portion 52 formed at one end of the protuberant portion 51. As shown in FIG. 11, a bolt 53 projects from the upside of the protuberant portion 51 and has a large-diameter portion 53a fitted into the circular hole 49 or each slot 50 of the horizontal fixing portion 41 of the lower-part connecting member 40.

The connecting member fitting T also has tongue-like pieces 54 respectively extending outward from opposite lower ends of the protuberant portion 51 rightward and leftward, a mounting hole 55 bored in each tongue-like piece 54, and a downward bent hitch portion 56 extending downward from the ridge-side edge of each tongue-like piece 54 to be brought into engagement with the ridge-side end face of the crosspiece 8.

The structure of one half of the lower side connecting member 75 of the side connecting member A' is exactly identical with that of the lower-part connecting member 40 of the intermediate connecting member A, so that the same numbers as those of the lower-part connecting member 40 are provided to the portions of the lower side connecting member 75 corresponding to those of the lower-part connecting member 40 to omit the description thereof.

Since the other half of the lower side connecting member 75 of the side connecting member A' is not provided with a waterproof sheet 9, the other half of the lower side connecting member 75 is provided with a waterproof wall 76 extending downward from an end of the overhang portion 44 and contacting the upside of the roof sheet 2, and a flashing piece 77 longitudinally formed on the inside of the waterproof wall 76, as shown in FIG. 17, instead of the downward piece 45 provided on the underside of the overhang portion 44.

A downward open receiving portion 78 is defined between the vertical wall 42 and the waterproof wall 76 of the lower side connecting member 75 to receive the side support member 3 and the waterproof rising wall 38 of the gable-side metal roof sheet 11.

The connecting member fittings T are fixed to the crosspieces 8 at proper intervals with nails or the like by making use of the mounting holes 55 of the tongue-like pieces 54. The lower-part connecting members 40 and the lower side connecting member 75 are mounted to these connecting member fittings T so as to be aligned with a line connecting the eaves and the ridge. Then, the bolts 53 of the connecting member fittings T are inserted into the circular holes 49 and the slots 50,50' of the lower-part connecting members 40 and the lower side connecting member 75 to be fastened with nuts, so that the lower-part connecting members 40 and the lower side connecting member 75 are fixed to the connecting member fittings T.

In this manner, the lower-part connecting members 40 and the lower side connecting member 75 are so mounted that they longitudinally slide about their central portions against the thermal expansion to absorb the thermal expansion (strain).

Figure 19:
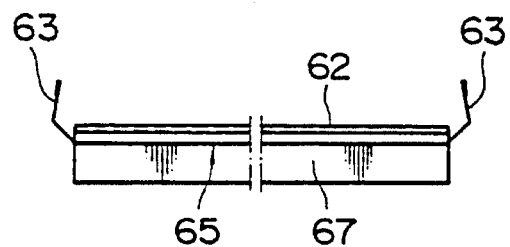
FIG. 19 is a front view showing an intermediate waterproof sheet.
Figure 20:
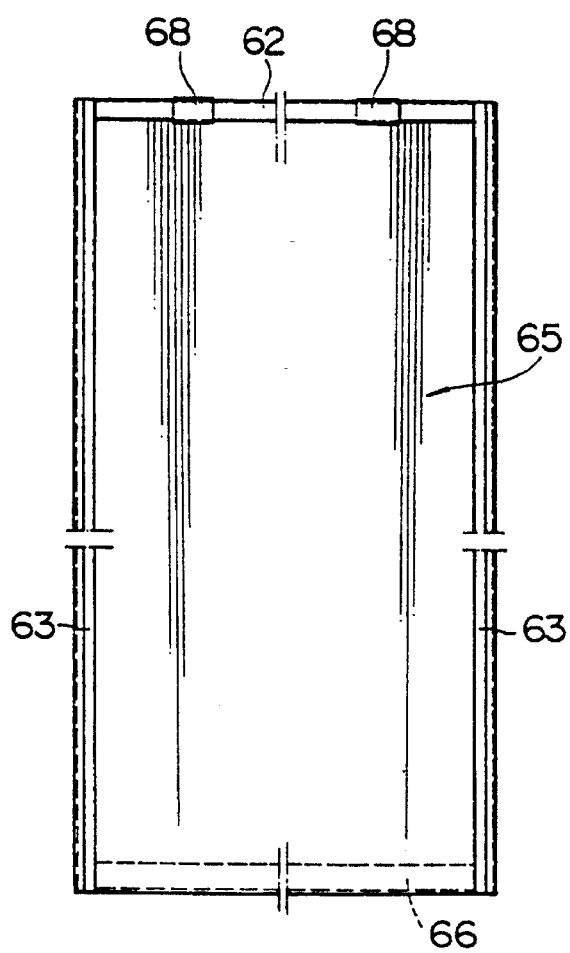
FIG. 20 is a plan view showing the intermediate waterproof sheet of FIG. 19.

FIGS. 18 through 26 show the structure of the waterproof sheet 9, respectively. As shown in FIGS. 18, 19 and 20, an eaves waterproof sheet 60 has an eaves throating portion 61 provided by bending upward an eaves-side end of a flat sheet portion toward the ridge and engaged with a front end of the horizontal portion 31 of the eaves support member 30, a flashing engagement wall 62 provided by bending upward the other end of the flat sheet portion toward the eaves, and engaging waterproof walls 63, i.e., rising portions provided at opposite sides of the flat sheet portion and inserted into the corresponding waterproof sheet inserting portions 46 of the lower-part connecting member 40. Each engaging waterproof wall 63 of the eaves waterproof sheet 60 is so formed that it is bent outward and upward, thence an intermediate portion of the bent portion is bent upward and slightly inward, and a front end of the resultant bent portion is folded back outward.

Figure 21:
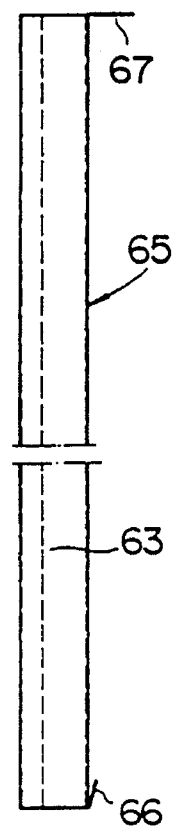
FIG. 21 is a side view showing the intermediate waterproof sheet of FIG. 21.
Figure 22:
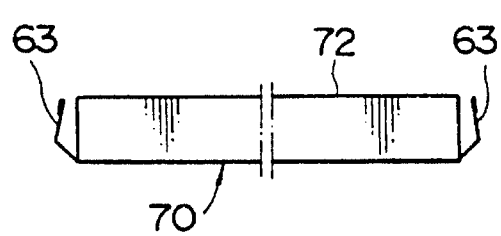
FIG. 22 is a front view showing a ridge waterproof sheet.
Figure 23:
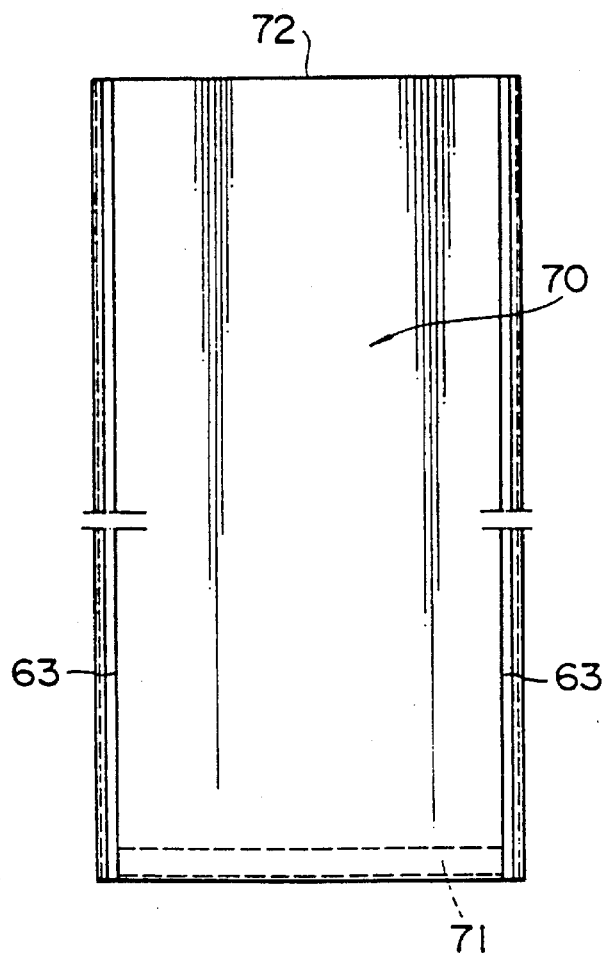
FIG. 23 is a plan view showing the ridge waterproof sheet of FIG. 22.

As shown in FIGS. 21, 22 and 23, an intermediate waterproof sheet 65 has an engagement throating portion 66 provided at an eaves-side end of a flat sheet portion and engaged with the flashing engagement wall 62, a flashing engagement wall 62 provided at the other end of the flat sheet portion similarly to the case of the eaves waterproof sheet 60, and engaging waterproof walls 63, i.e., rising portions provided at opposite sides of the flat sheet portion and inserted into the corresponding waterproof sheet inserting portions 46 of the lower-part connecting member 40 similarly to the case of the eaves waterproof sheet 60.

Figure 27:
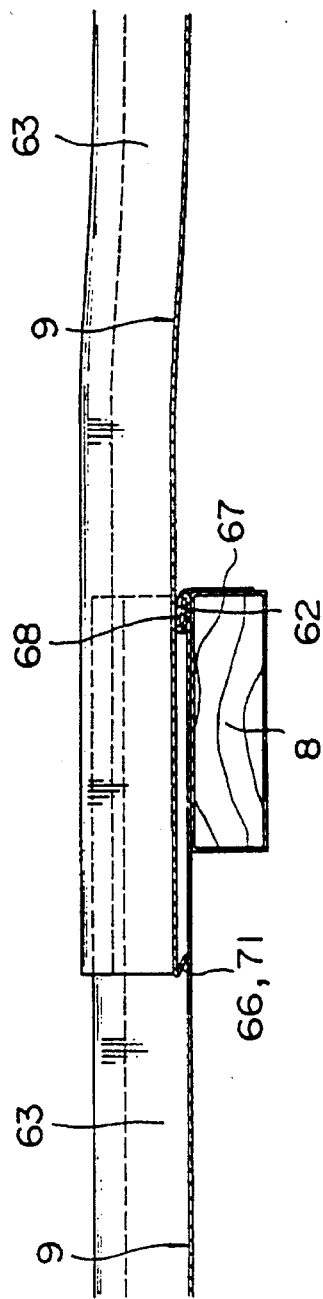
FIG. 27 is a fragmentary enlarged-scale sectional view showing the waterproof sheet of FIG. 26 after being laid.

As shown in FIG. 27, a crosspiece engaging member 67 extending downward is provided along a ridge-side edge of each of the eaves waterproof sheet 60 and the intermediate waterproof sheet 65 and mounted to the flashing engagement wall 62 with a proper number of caulking portions 68 formed at the upper end of the crosspiece engaging member 67.

Figure 25:
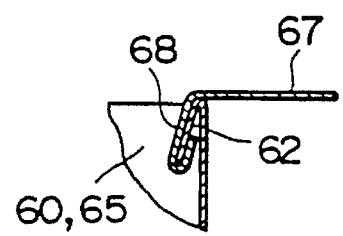
FIG. 25 is a fragmentary sectional view showing the eaves waterproof sheet and the intermediate waterproof sheet.
Figure 24:
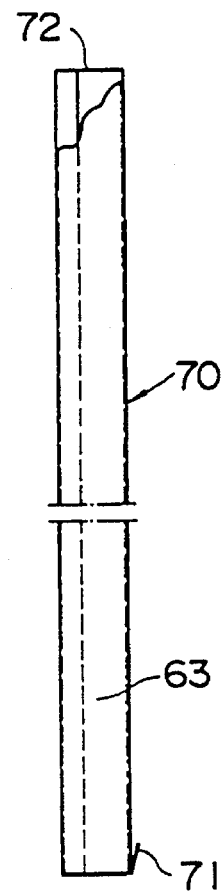
FIG. 24 is a side view showing the ridge waterproof sheet of FIG. 22.
Figure 26:
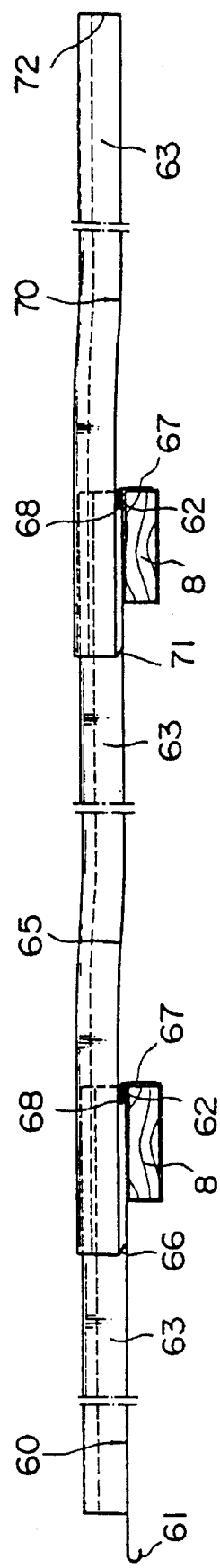
FIG. 26 is a fragmentary side sectional view showing a waterproof sheet after being laid on supports.

As shown in FIGS. 24, 25 and 26, a ridge waterproof sheet 70 has an engagement throating portion 71 provided at an eaves-side end of a flat sheet portion and engaged with the flashing engagement wall 62 of the intermediate waterproof sheet 65, an upward vertically bent waterproof wall 72 provided at the other end of the flat sheet portion, and engaging waterproof walls 63, i.e., rising portions provided at opposite sides of the flat sheet portion and inserted into the corresponding waterproof sheet inserting portions 46 of the lower-part connecting member 40 similarly to the cases of the eaves waterproof sheet 60 and the intermediate waterproof sheet 65.

Figure 28:
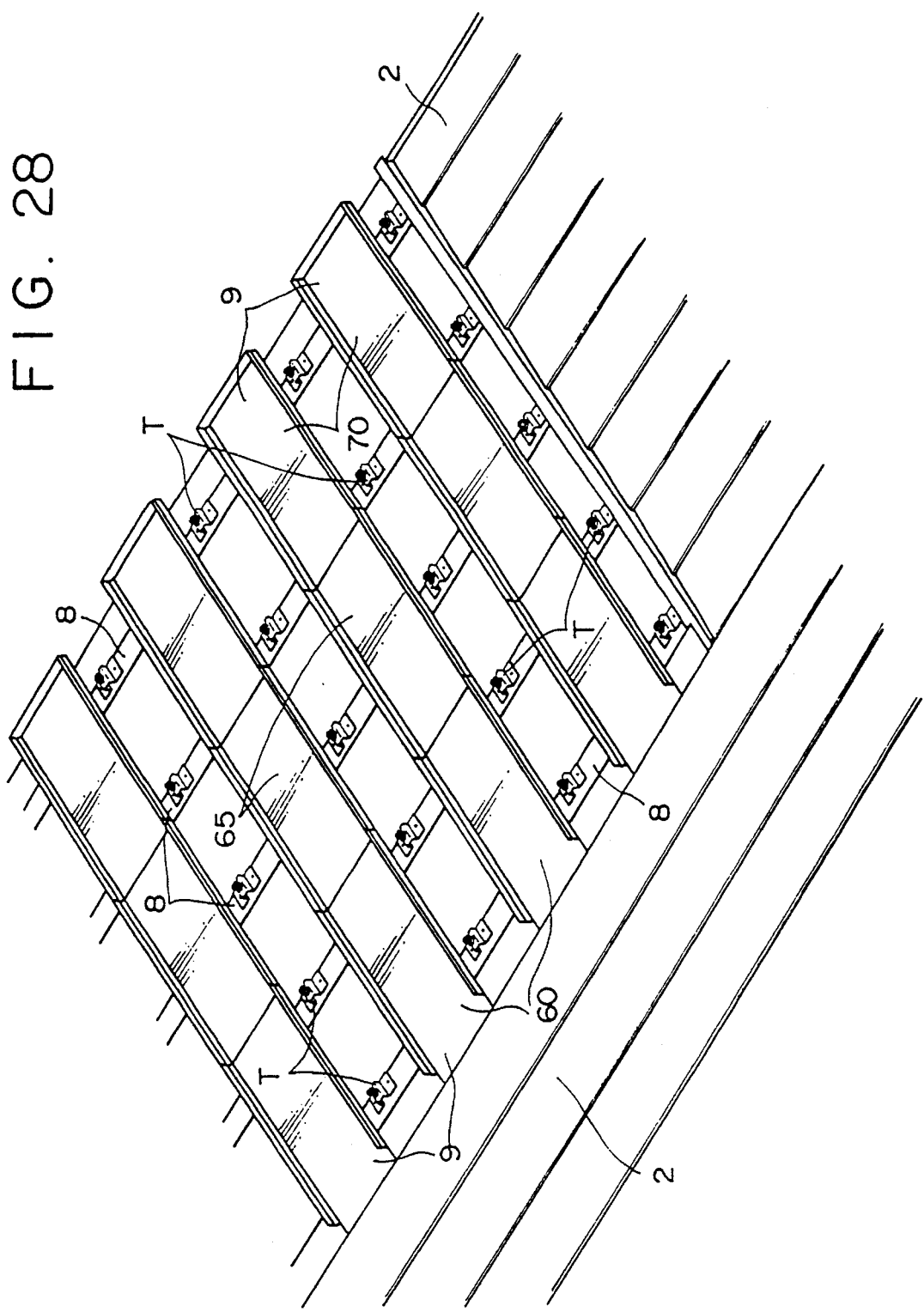
FIG. 28 is a fragmentary perspective view showing the waterproof sheet mounting.
Figure 29:
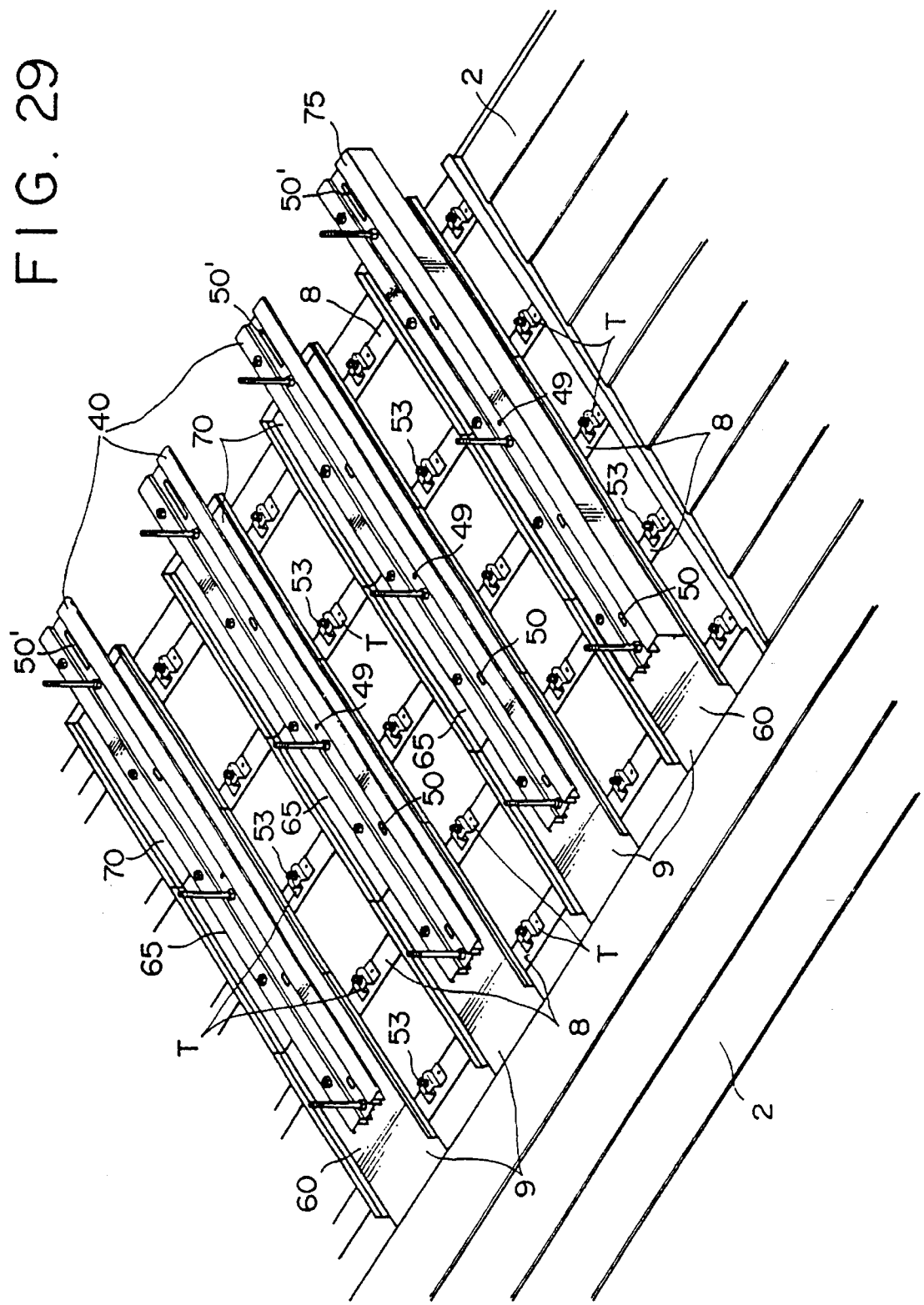
FIG. 29 is a fragmentary perspective view showing the lower-part connecting member and the lower side connecting member prior to the mounting.

FIGS. 28 and 29 show the connection of each waterproof sheet 9. The eaves throating portion 61 of the eaves waterproof sheet 60 is mounted to the sheathing roof board toward the eaves, and the edge of the intermediate waterproof sheet 65 at the side of the engagement throating portion 66 is overlaid on the edge of the eaves waterproof sheet 60 at the side of the flashing engagement wall 62.

Also, the edge of the ridge waterproof sheet 70 at the side of the engagement throating portion 71 is overlaid on the edge of the intermediate waterproof sheet 65 at the side of the flashing engagement wall 62 to be connected to each other.

Then, the crosspiece engaging member 67 of the eaves waterproof sheet 60 and that of the intermediate waterproof sheet 65 are fastened to the upper ends of the crosspieces 8 to prevent the eaves waterproof sheet 60 and the intermediate waterproof sheet 65 from sliding down.

Figure 30:
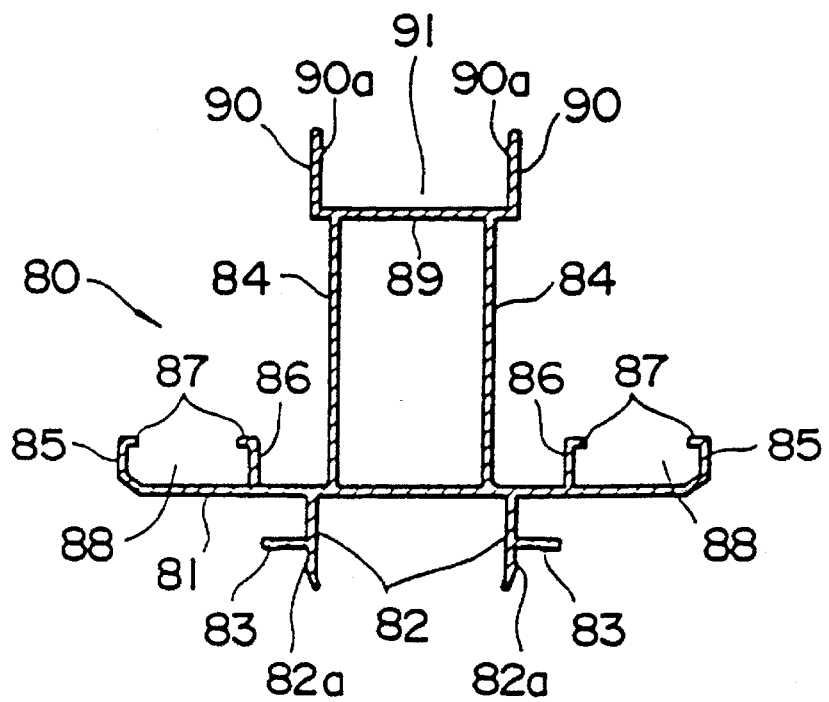
FIG. 30 is a front view showing an upper-part connecting member.
Figure 31:
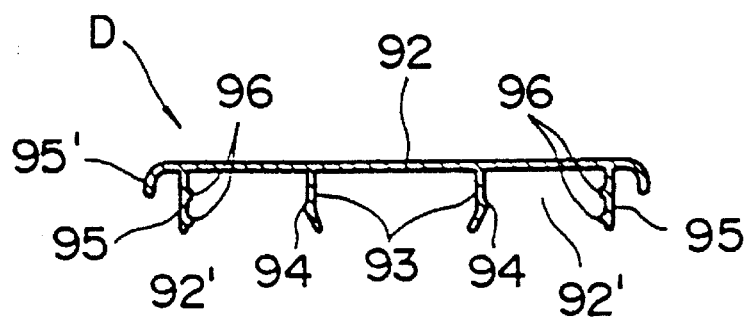
FIG. 31 is a front view showing an intermediate connecting member cover.
Figure 32:
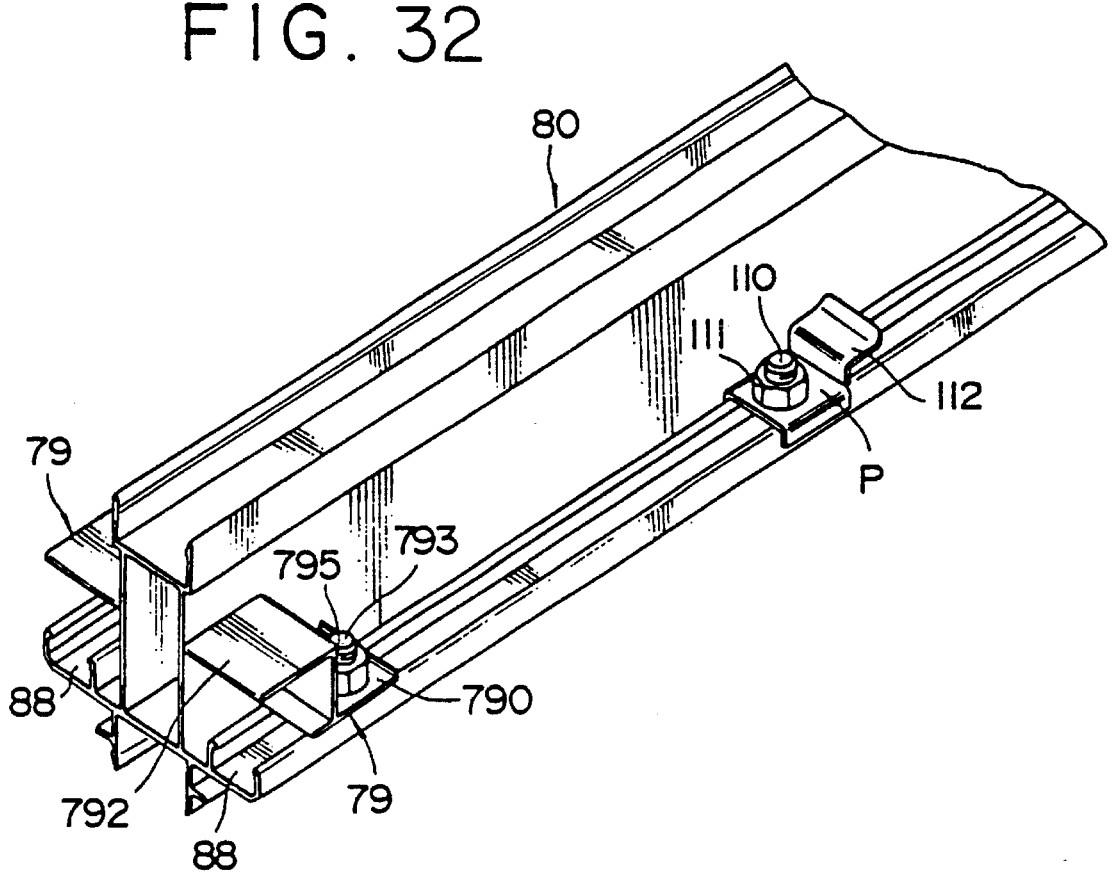
FIG. 32 is a perspective view showing the upper-part connecting member after the eaves cover engaging support member is mounted thereto.

FIGS. 30 through 31 show a way of mounting the waterproof sheets 9, the lower-part connecting members 40 and the lower side connecting member 75, respectively.

Firstly, as shown in FIG. 30, the eaves waterproof sheets 60, the intermediate waterproof sheets 65 and the ridge waterproof sheets 70 are arranged in the mentioned order between the connecting member fittings T, T mounted to the respective crosspieces 8.

Secondly, as shown in FIG. 31, the lower-part connecting members 40 and the lower side connecting member 75 are mounted on the connecting member fittings T so as to be aligned with the line connecting the ridge and the eaves, and the bolts 53 of the connecting member fittings T are inserted into the circular holes 49 and the slots 50, 50' of the lower-part connecting members 40 and of the lower side connecting member 75.

Figure 33:
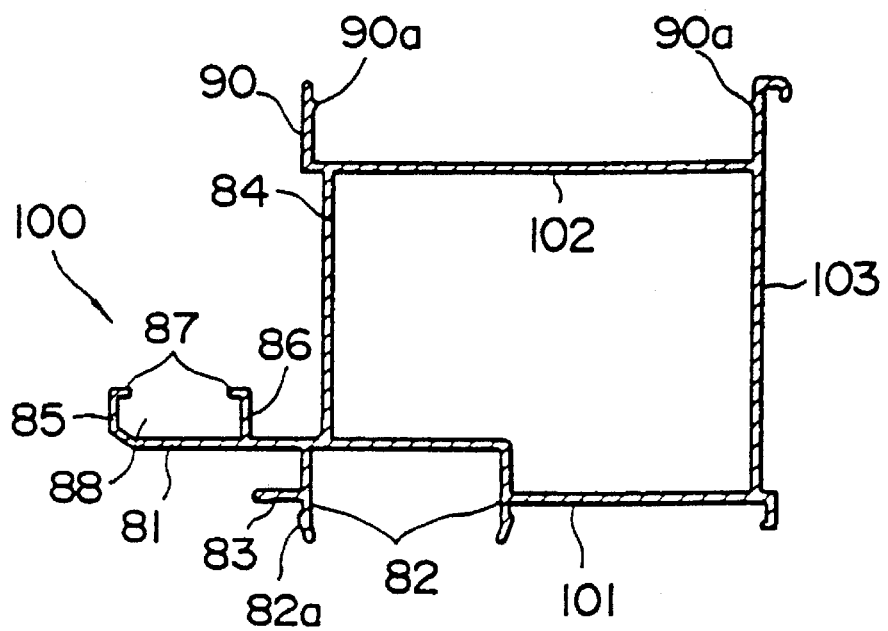
FIG. 33 is a front view showing an upper side connecting member.

As shown in FIG. 33, the upper-part connecting member 80 of the intermediate connecting member A for interconnecting the lighting frames B has a pair of walls 82 extending downward from the underside of a horizontal base plate 81 and inserted into the fitting recess 43 of the lower-part connecting member 40. A lower end of each wall 82 is inclined inward and an engaging portion 82a is formed on the outside surface of each wall 82 to be engaged with the engaging protuberance portion 42a of the lower-part connecting member 40. A horizontal contact piece 83 is provided on the center of the outside surface of each wall 82 to be mounted to the overhang portion 44 of the lower-part connecting member 40.

Two vertical pieces 84 are provided at an interval on she upside of the horizontal base plate 81 of the upper-part connecting member 80 as being located close to the center thereof, and two end rising walls 85 are respectively provided on opposite edges of the horizontal base plate 81.

An intermediate rising wall 86 is provided between each vertical piece 84 and the corresponding end rising wall 85 of the upper-part connecting member 80, and projections 87 are respectively provided at the upper ends of the end rising wall 85 and the intermediate rising wall 86 and inwardly confronting each other, wherein a wide fit groove 88 open upward is defined by the end rising wall 85, the intermediate rising wall 86 and the horizontal base plate 81.

A horizontal receiving piece 89 is provided across a portion between the upper ends of the vertical pieces 84 of the upper-part connecting member 80, and engaging projection pieces 90 having engaging projections 90a provided on the inner surfaces of end portions are provided on opposite edges of the horizontal receiving piece 89, wherein an upward opening portion 91 is defined by the horizontal receiving piece 89 and the engaging projection pieces 90.

Figure 39:
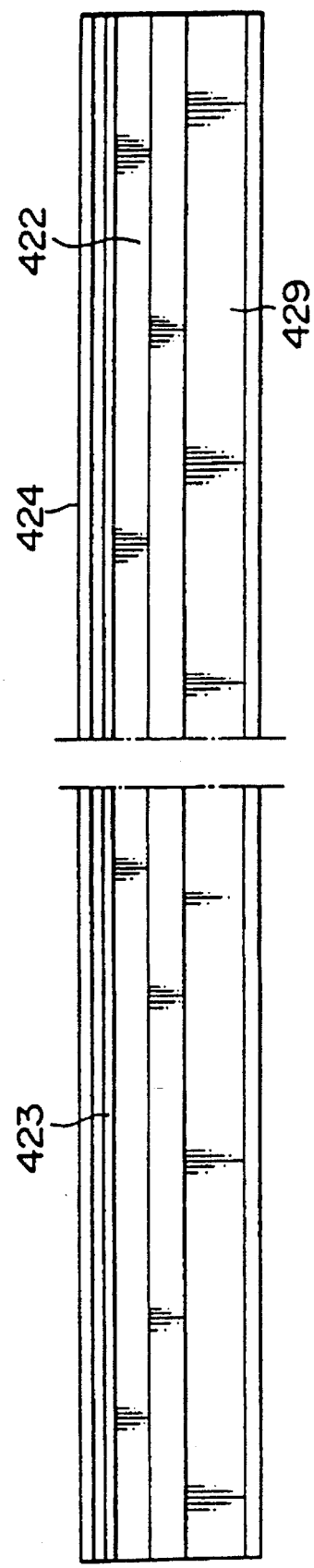
FIG. 39 is a side view showing the upper horizontal sash member.
Figure 40:
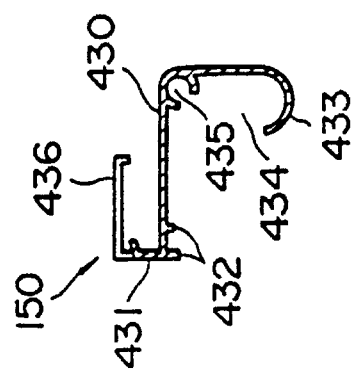
FIG. 40 is a cross-sectional view showing a lower horizontal sash member.

Also, a portion of the horizontal base plate 81 and a portion of the horizontal receiving piece 89 corresponding to a portion between the vertical pieces 84 of the upper-part connecting member 80 are provided with fixing holes (See FIG. 39), through which the connection bolts 47 of the lower-part connecting member 40 are inserted.

Figure 36:
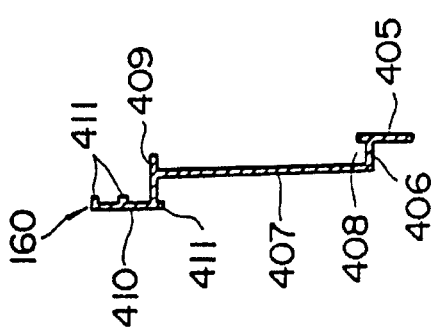
FIG. 36 is a cross-sectional view showing a longitudinal sash member.

Further, as shown in FIG. 36, eaves cover engaging support members 79 are mounted to eaves-side opposite side portions of the upper-part connecting member 80.

Each eaves cover engaging support member 79 has a fixing piece 790 provided with a bolt hole 791, an inverse L-shaped engaging piece 792 extending from the upside of one end of the fixing piece 792 toward the eaves, and an engaging projection 795 formed at the ridge-side upper end of the engaging piece 792. The eaves cover engaging support members 79 are mounted to the eaves-side opposite side portions of the upper-part connecting member 80 by inserting bolts 793 having head portions fitted to the fitting grooves 88 of the upper-part connecting member 80 through the corresponding bolt holes 791 and screwing the nuts 794 onto the bolts 793.

Further, light-transmitting frame fitting P is mounted to each side portion of the upper-part connecting member 80 at a proper interval so as to cover the fitting groove 88, and fixed by a bolt 110 and a nut 111 by making use of the fitting groove 88 of the upper-part connecting member 80.

The light-transmitting frame fitting P has an engaging projection piece 112 formed at its upper portion and opening to the ridge, and a fitting engagement piece 177 formed on an upper horizontal sash member 170 of the frame B is fitted from above to the engaging projection piece 112 of the light-transmitting frame fitting P (See FIG. 2).

Figure 34:
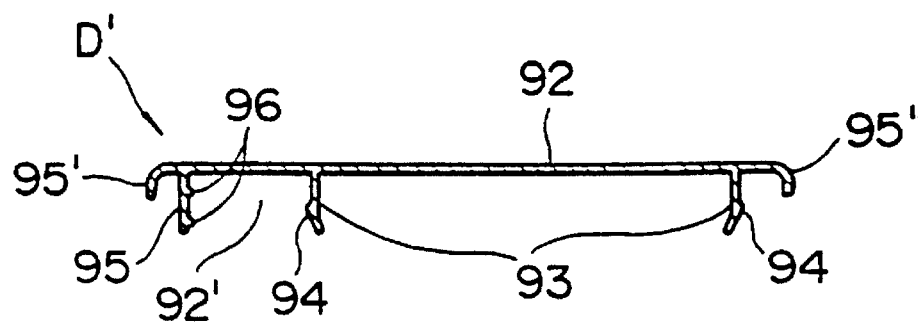
FIG. 34 is a front view showing a side connecting member cover.
Figure 35:
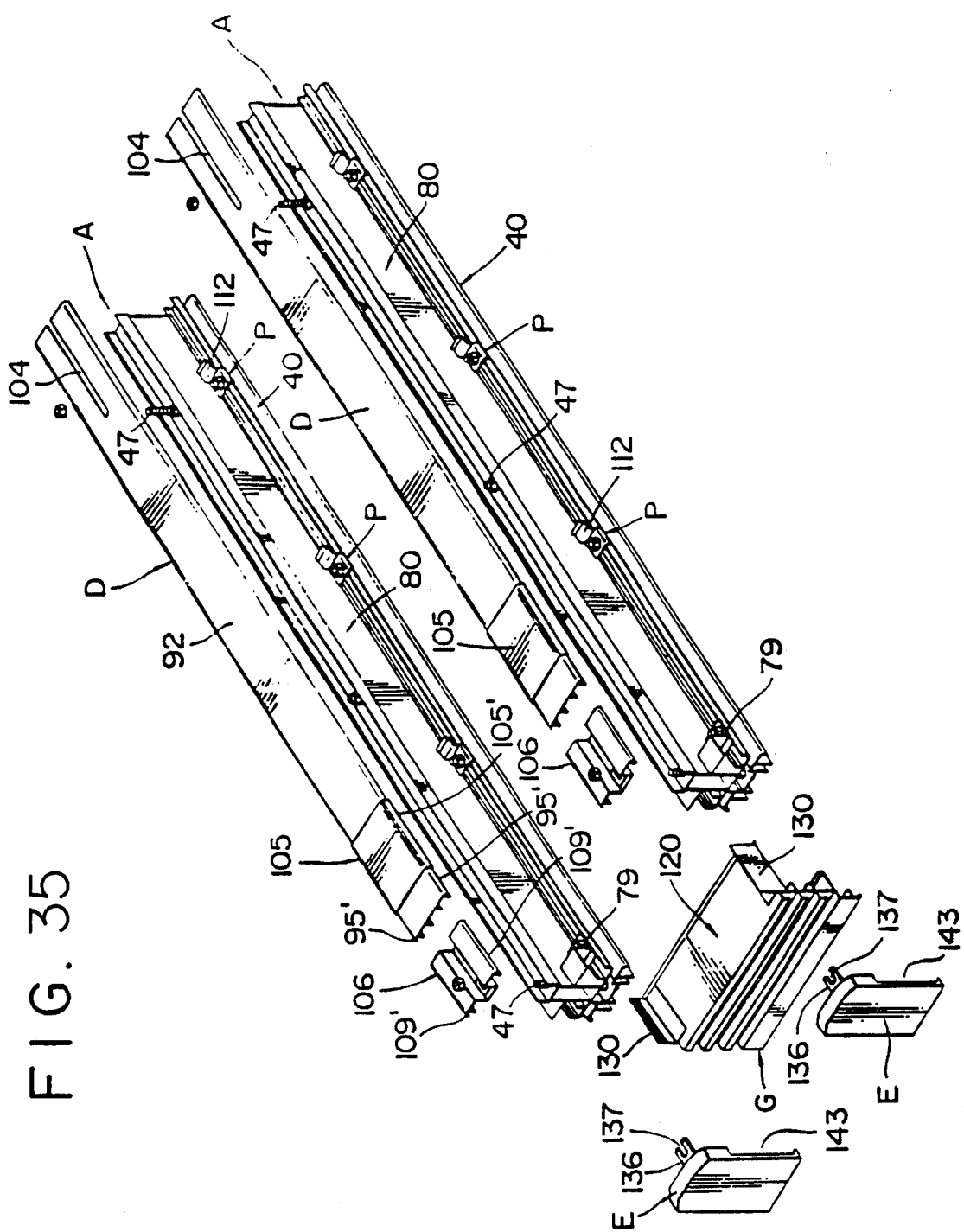
FIG. 35 is a fragmentary perspective view showing an eaves cover prior to the mounting.

As shown in FIG. 34, the intermediate connecting member cover D mounted to the upper-part connecting member 80 has a horizontal cover portion 92, engaging curved portions 95' formed by bending downward the opposite ends of the horizontal cover portion 92, and engaging leg portions 93 provided at an interval to be close to the center of the underside of the horizontal cover portion 92 and inserted into the upward open portion 91 of the upper-part connecting member 80.

The tip of each engaging leg portion 93 of the intermediate connecting member cover D is bent slightly inward, and the outside surface of each engaging leg portion 93 is formed with an engaging portion 94 engaged with the engaging projection 90a of the upper-part connecting member 80.

The intermediate connecting member cover D also has throating pieces 95 extending downward from the underside of the horizontal cover portion 92 and located close the the opposite ends thereof, and a plurality of throating projection rows 96 formed on the inside surface of each throating piece 95, wherein a wide upper-part adjusting space 92'0 is defined below each side of the horizontal cover portion 92.

Since the structure of one half of the upper side connecting member 100 of the side connecting member A' mounted to the lower side connecting member 75 is exactly identical with that of the intermediate connecting member A, the same numbers as those of the intermediate connecting member A are provided to the portions of the upper side connecting member 100 corresponding to those of the intermediate connecting member A to omit the description thereof.

Figure 37:
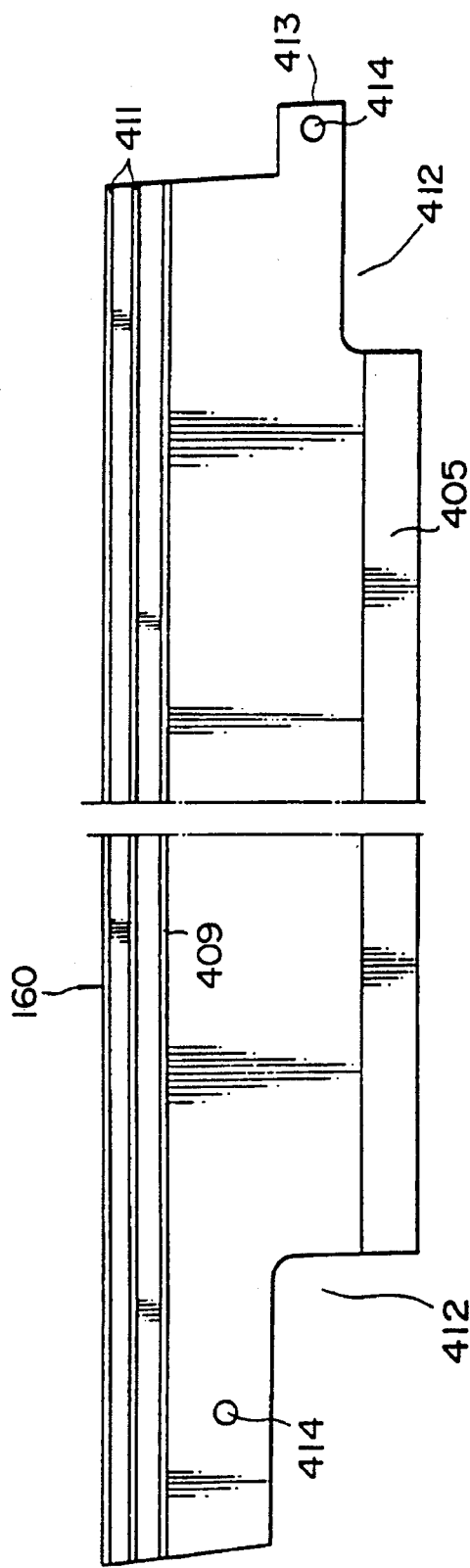
FIG. 37 is a side view showing the longitudinal sash member.

Since no light-transmitting frame B is mounted to the other half of the upper side connecting member 100 of the side connecting member A', the other half of the upper side connecting member is not provided with the vertical piece 84, the end rising wall 85 and the intermediate rasing wall 86, but has a lower-part connecting member contact piece 101 formed by extending sidewise the horizontal contact piece 83 and mounted to the upside of the overhang portion 44 of the lower side connecting member 75, and a horizontal portion 102 formed by extending outward the horizontal receiving portion 89, as shown in FIG. 37.

The upper side connecting member 100 also has a side end face vertical wall 103 extending upward from the tip of the lower-part connecting member contact piece 101 through the tip of the horizontal portion, and an engaging projection 90a provided on the inner surface of the vertical wall 103 and close to its upper end. The upper end of the vertical wall 103 is bent outward.

Also, the lighting frame fitting P is mounted to the fitting groove 88 of the upper side connecting member 100 of the side connecting member A', similarly to the case of the upper-part connecting member 80.

Since the structure of one half of the side connecting member cover D' mounted to the upper side connecting member 100 is exactly identical with that of the intermediate connecting member cover D, the same numbers as those of the intermediate connecting member cover D are provided to the portions of the side connecting member cover D' corresponding to those of the intermediate connecting member cover D to omit the description thereof.

Figure 38:
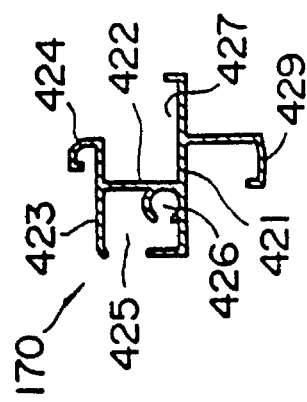
FIG. 38 is a cross-sectional view showing an upper horizontal sash member.

Since the other half of the side connecting member cover D' is not provided with the throating piece 95 at the same side as the horizontal portion 102 corresponding to the upper side connecting member 100, as shown in FIG. 38, the horizontal cover portion 92 is slightly extended to cover the horizontal portion 102 of the upper side connecting member 100.

Figure 41:
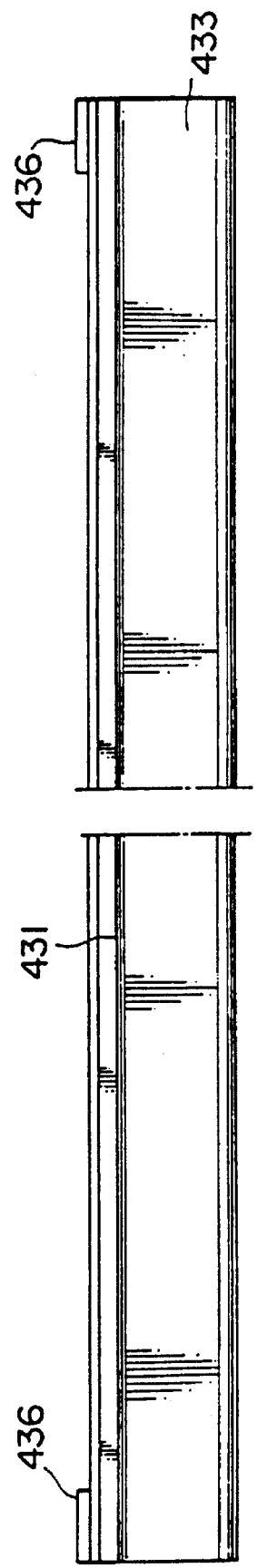
FIG. 41 is a side view showing the lower horizontal sash member.
Figure 42:
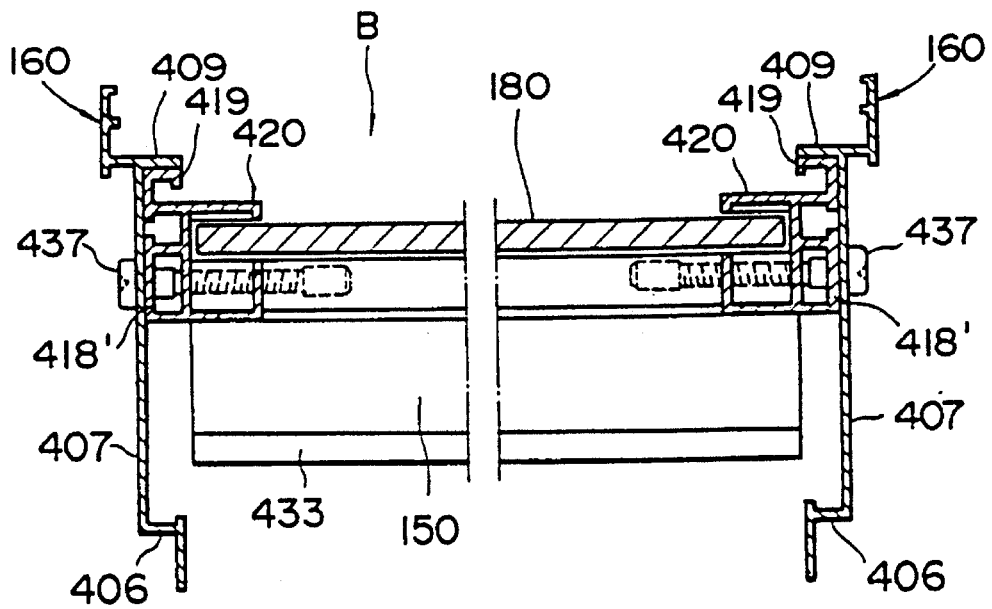
FIG. 42 is a cross-sectional view showing the eaves-side end of the light-transmitting frame.
Figure 43:
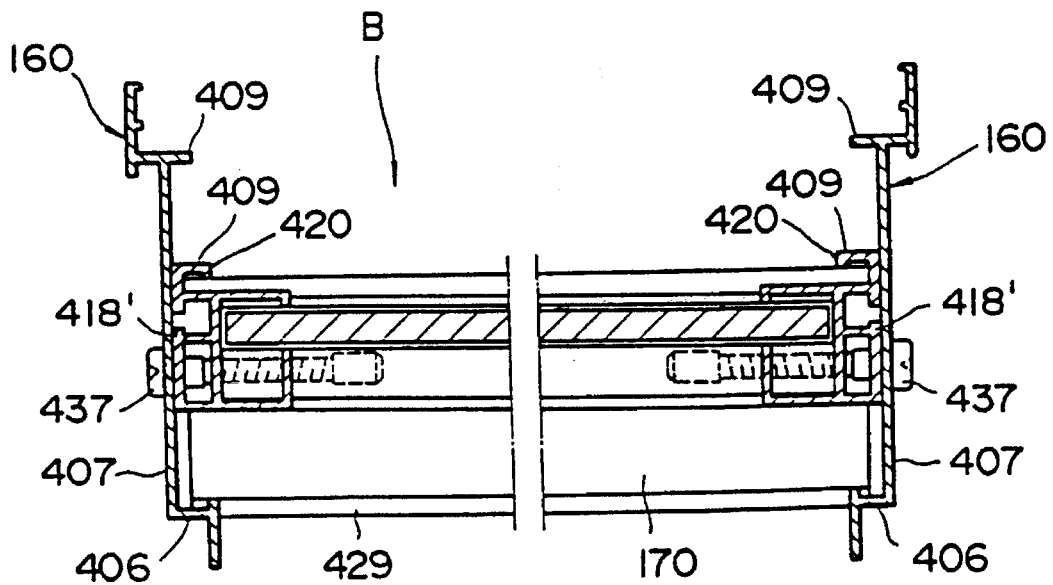
FIG. 43 is a cross-sectional view showing the eaves-side end of the light-transmitting frame.
Figure 45:
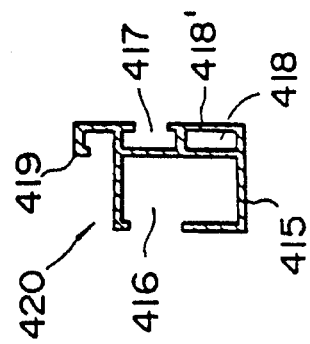
FIG. 45 is a sectional view showing the light-transmitting sheet support sash member.
Figure 44:
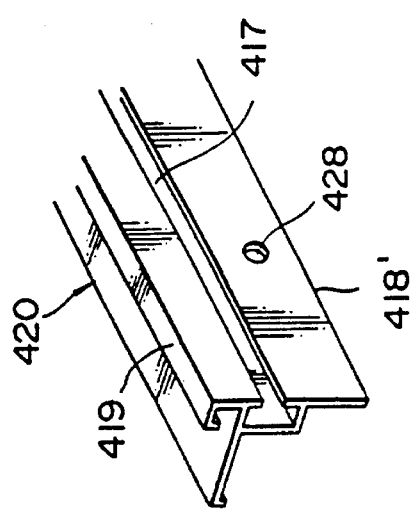
FIG. 44 is a fragmentary perspective view showing a light-transmitting sheet support sash member.
Figure 46:
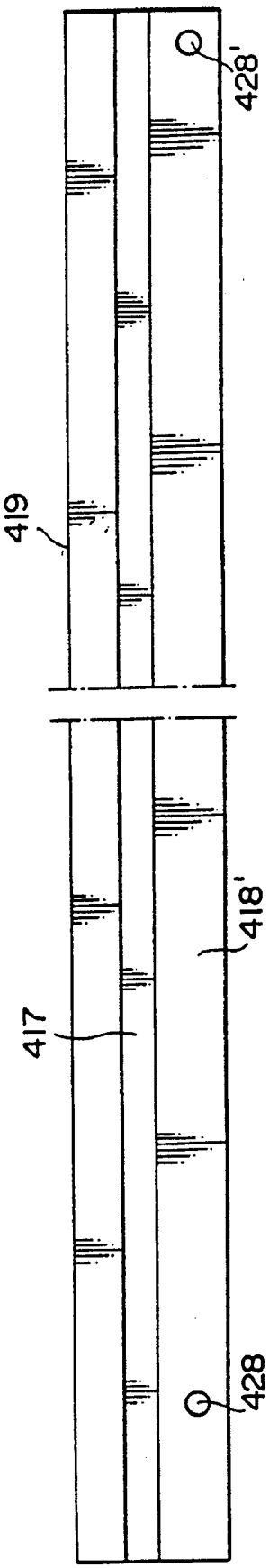
FIG. 46 is a side view showing the light-transmitting sheet support sash member.
Figure 49:
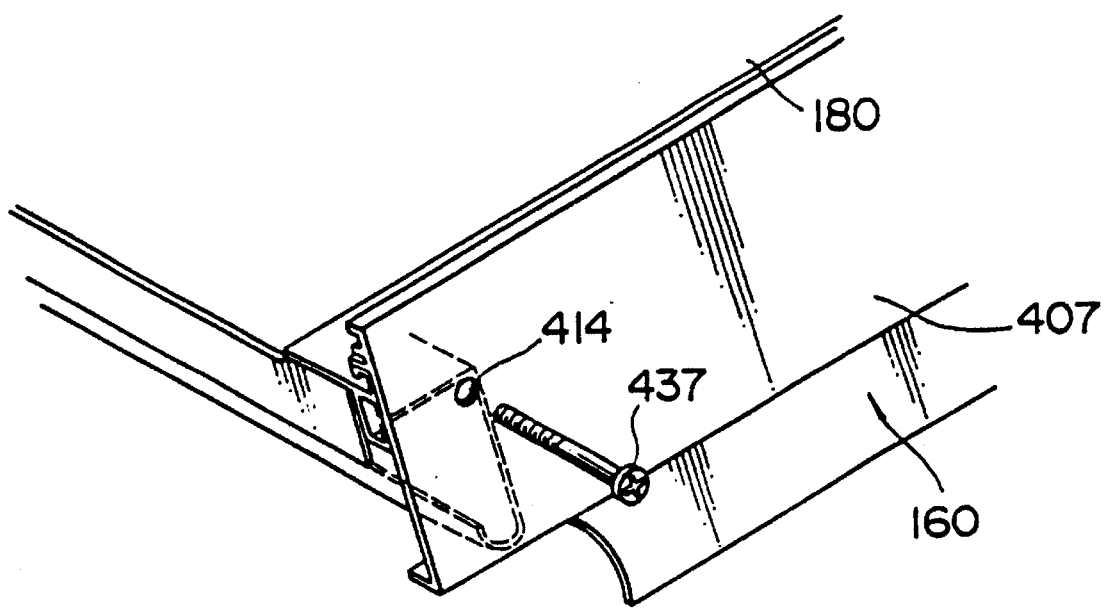
FIG. 49 is a fragmentary exploded perspective view showing the light-transmitting frame.
Figure 50:
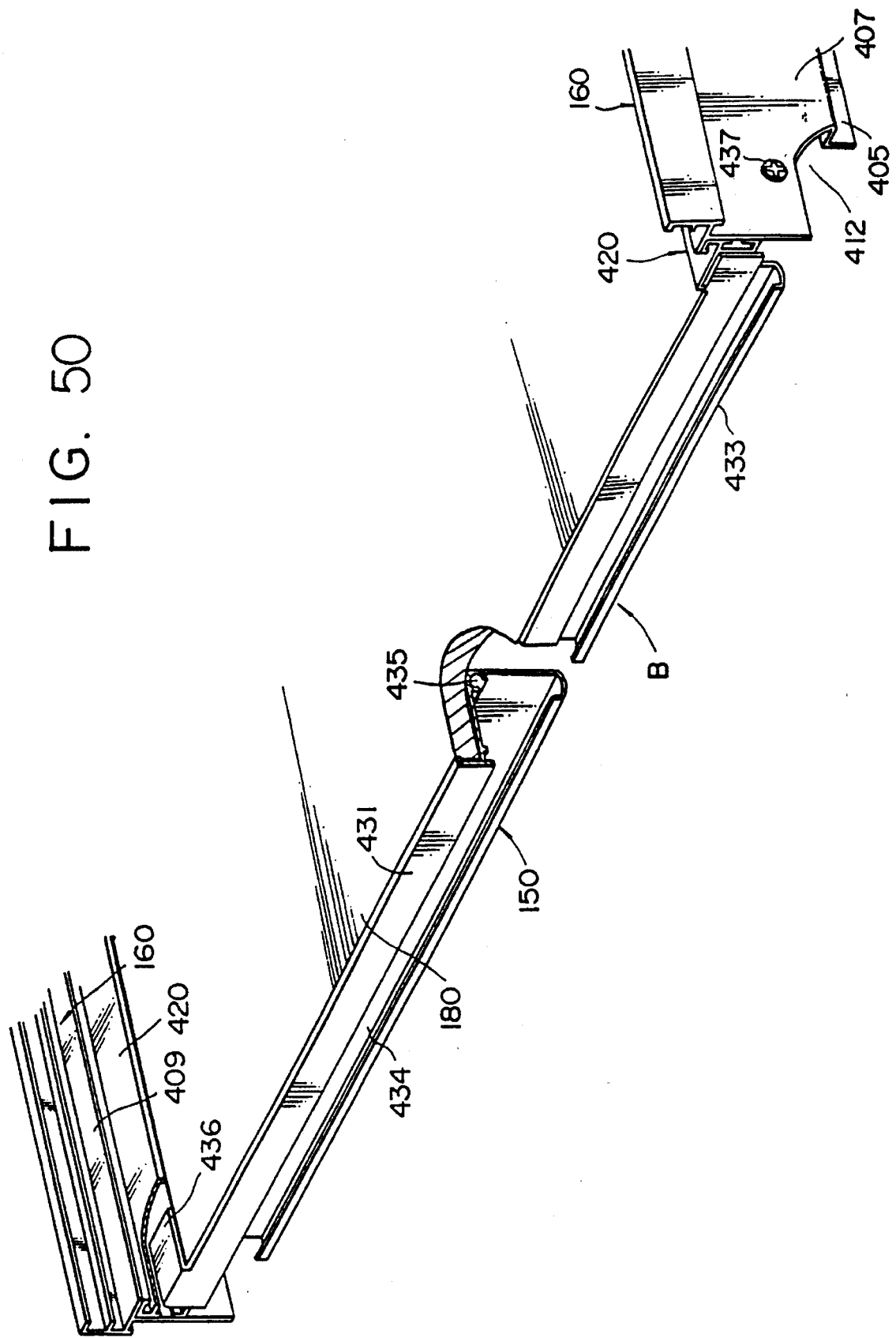
FIG. 50 is a perspective view, partly omitted, showing the light-transmitting frame.
Figure 51:
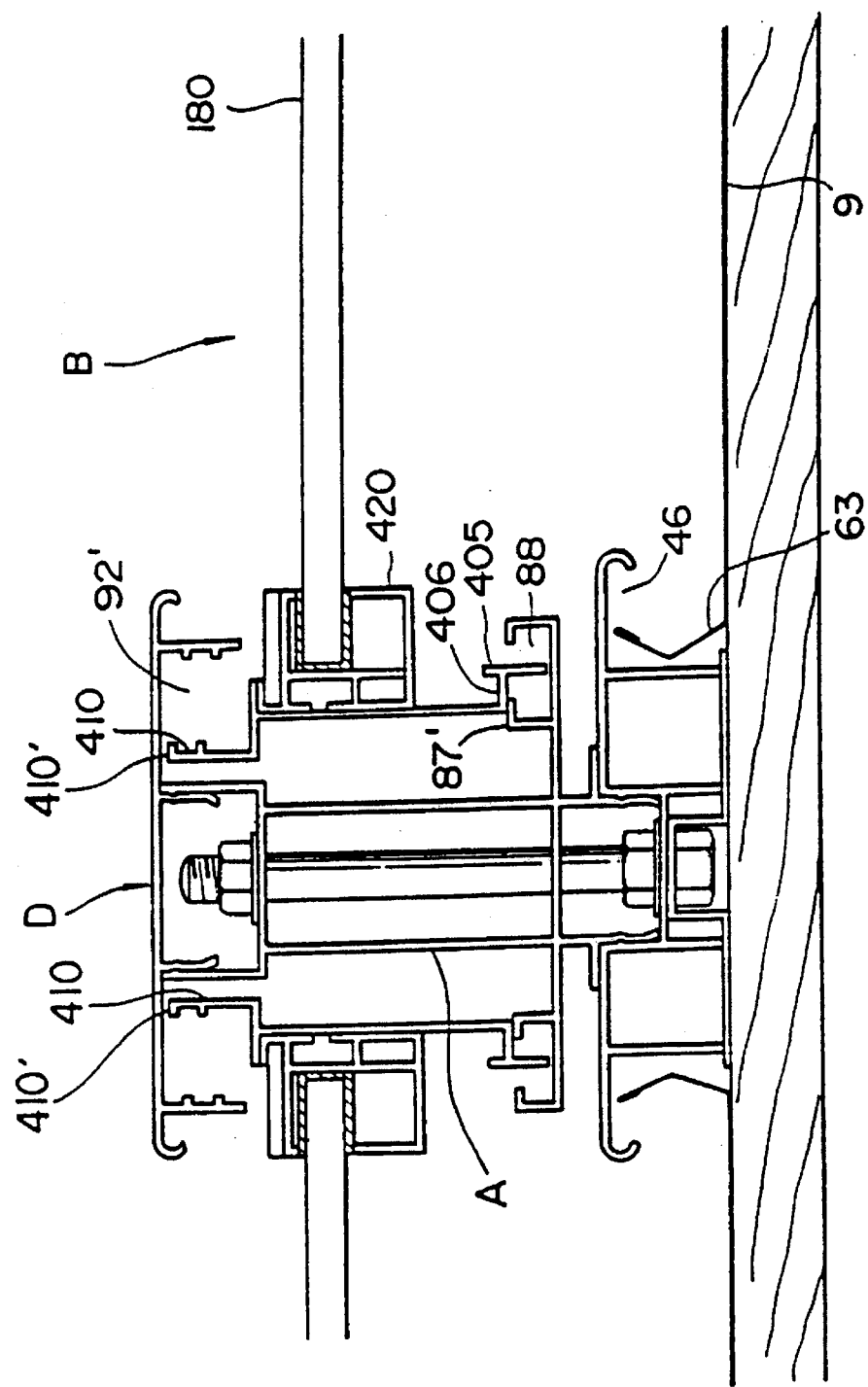
FIG. 51 is a fragmentary cross-sectional view showing the roof.
Figure 52:
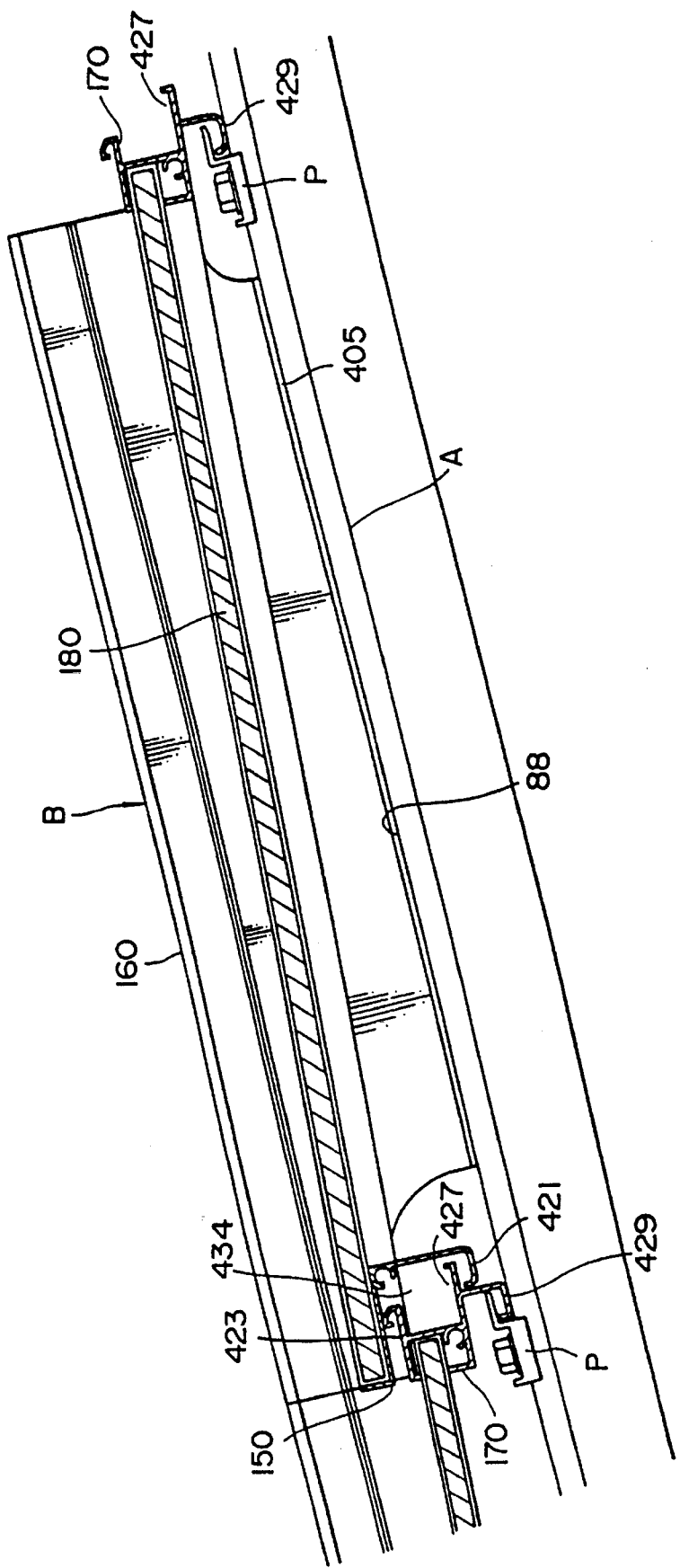
FIG. 52 is a fragmentary longitudinal sectional view showing the roof.

Then, as shown in FIG. 41 since the eaves cover G is mounted as being fittingly engaged with the eaves cover engaging support members 79 mounted to the eaves portions of the upper-part connecting members 80, the error of the width of the sheathing roof board is satisfactorily absorbed to facilitate the detachment when the eaves part is inspected and cleaned, and besides, the eaves cover G is firmly fastened without getting out of the upper-part connecting members 80 for the wind pressure.

Eaves fit plates 106 are respectively mounted to the upside of both the eaves-side end of the upper-part connecting member 80 of the intermediate connecting member A and that of the upper side connecting member 100 of the side connecting member A'. Each eaves fit plate 106 is provided on its opposite ends with engaging curved portions 109 having the same shape as the engaging curved portions 95' of the intermediate connecting member cover D. The eaves fit plates 106 have downward projecting central recess grooves 107 fitted into both the upward open portion 91 of the upper-part connecting member 80 and that of the upper side connecting member 100, and the connection bolt 47 of the lower-part connecting member 40 and that of the lower side connecting member 75 are inserted into the slots 108 bored in the bottom surface of the recess grooves 107.

After the dustproof caps E are respectively mounted to both the eaves end face of the intermediate connecting member A and that of the side connecting member A', the intermediate connecting member cover D is fittingly mounted to the upper-part connecting member 80 of the intermediate connecting member A, and the side connecting member cover D' is fittingly mounted to the upper side connecting member 100 of the side connecting member A'. Then, the connection bolt 47 of the lower-part connecting member 40 and that of the side connecting member 75 which are closest to the ridge are respectively inserted into the fitting insertion notch 104 of the intermediate connecting member cover D and that of the side connecting member cover D', and the nuts are screwed onto the connection bolts 47 to fix the intermediate connecting member cover D and the side connecting member cover D' to the intermediate connecting member A and the side connecting member A', respectively.

The slide covers 105 are mounted to both the intermediate connecting member cover D and the side connecting member cover D' in such manner that the engaging projection pieces 105' provided at the opposite ends of the slide covers 105 are slidably engaged with both the engaging curved portions 95' of the intermediate connecting member cover D and those of the side connecting member cover D'. The engaging projection pieces 105' of the slide covers 105 engagingly slide along the engaging curved portions 95' of the connecting member covers D and D' and thence slide along the engaging curved portions 109 of the eaves fit plates 106 to be fitted into the corresponding cavities 139 of the dustproof caps E, so that the eaves-side end of both the intermediate connecting member cover D and the side connecting member cover D' are respectively fixed to both the intermediate connecting member A and each side connecting member A'. As a result, the eaves part of an integral structure is provided by one eaves bolt 47, and besides, the eaves part is formed into a wind-pressure tight structure which facilitates the detachment and is excellent in external appearance without appearing any bolt fitting on the surface.

FIG. 41 shows the mounting of the eaves cover G to a portion between the intermediate connecting members A and A.

Next will be explained another embodiment of the lighting frame B.

The lighting frame B according to this embodiment is composed of opposite longitudinal sash members 160, a light-transmitting sheet support sash member 420, an upper horizontal sash member 170, a lower horizontal sash member 150, and a light-transmitting sheet 180 made of glass and acrylic or the like and fitted to the inside of a square-shaped frame constituted by the above-mentioned respective sash members.

As shown in FIG. 134, each longitudinal sash member 160 has a vertical support leg 405 provided at the lower end of the sash member 160 and inserted into the fit groove 88 of each connecting member A or A', a lower horizontal wing piece 406 provided on the outside surface at an upper end of the vertical support leg 405, a vertical wall 407 extending upward from the tip of the lower horizontal wing piece 406, a drain groove 408 defined on the upside of the lower horizontal wing piece 406 and an upper horizontal wing piece 409 provided at an upper end of the vertical wall 407.

Each longitudinal sash member 160 also has a rising waterproof wall 410 extending upward form an outside end of the upper horizontal wing piece 409 and fitted to the upper-part adjusting space 92' of each connecting member A or A', and a plurality of longitudinal throating projections 411 provided on the inner surface and the lower end of the rising waterproof wall 410.

As shown in FIG. 135, exhaust notches 412 are respectively formed at opposite lower ends of the vertical support leg 405 and those of the vertical wall 407, and a projecting portion 413 is provided at an edge of the vertical wall 407 close to the ridge so as to face to the upper end of each notch 412. Also, mounting holes 414 are bored in the projecting portion 413 and an end of the vertical wall 407 close to the eaves such that the hole 414 close to the eaves is positioned higher than the other hole.

As shown in FIG. 143, the light-transmitting sheet support sash member 420 has a light-transmitting sheet insertion frame 415 having the substantially C-like form in cross section, a longitudinal void 416 used for the insertion of the light-transmitting sheet and defined above an inside wall of the light-transmitting sheet insertion frame 415, a recessed groove 417 defined above the outside surface of the light-transmitting sheet insertion frame 415 and preventing capillary action, a draining cavity 418 defined below the recessed groove 417, and an inverse L-shaped throating wall 419 extending from an outside end of the upside of the light-transmitting sheet insertion frame 415.

As shown in FIG. 142, the underside of the light-transmitting sheet insertion frame 415 and the cavity 418 positioned at the longitudinal opposite lower ends of the light-transmitting sheet support sash member 420 are partially notched in order to be fitted to the end of the upper horizontal sash member 170 and that of the lower horizontal sash member 150, and fixing holes 428 extending through the outside wall 418' of the cavity 418 are respectively bored in opposite ends of the light-transmitting sheet support sash member 420 in the eaves-ridge direction.

As shown in FIG. 136, the upper horizontal sash member 170 has a belt-like horizontal piece 421 extending orthogonally to the eaves-ridge direction, a rising wall 422 provided on the upside of the horizontal piece 421 in its longitudinal direction, a horizontal upper surface 423 provided on the upper end of the rising wall 422 and extending parallel to the horizontal piece 421, a flashing wall 424 provided by folding back a ridge-side end of the horizontal upper surface 423, a light-transmitting sheet support groove 425 defined at the eaves side of the rising wall 422, a hollow curved groove 426 defined at the eaves-side lower end of the rising wall 422, a drain groove 427 defined on the upside of the horizontal piece 421, and a fitting engagement piece 429 provided on the underside of the horizontal piece 421 and formed by extending downward from the underside of the horizontal piece 421, and then bending the tip toward the eaves and further upward.

As shown in FIG. 138, the lower horizontal sash member 150 has a light-transmitting sheet mounting piece 430, a light-transmitting sheet contact wall 431 extending from the upside of an eaves-side edge of the light-transmitting sheet mounting piece 430 and having the height substantially equal to the thickness of the light-transmitting sheet 180, a plurality of throating projections 432 longitudinally provided on the underside of the light-transmitting sheet mounting piece 430, a curved waterproof gutter 433 provided at a ridge-side edge of the light-transmitting sheet mounting piece 430 and curved downward in the eaves direction, and a recess 434 defined by the underside of the light-transmitting sheet mounting piece 430 and the curved waterproof gutter 433 and fitted to the upper horizontal sash member 170.

The lower horizontal sash member 150 also has a hollow curved groove 435 provided at an eaves-side connection edge between the light-transmitting sheet mounting piece 430 and the curved waterproof gutter 433, and light-transmitting sheet press pieces 436 extending from longitudinal opposite upper edges of the light-transmitting sheet contact wall 431 toward the ridge.

To assemble lighting frame B, the outside wall 418' of the cavity 418 of the light-transmitting sheet support sash member 420 is brought into contact with the inner surface of the vertical wall 407 of the longitudinal sash member 160, and the upper end of the throating wall 419 of the light-transmitting sheet support sash member 420 is brought into contact with the upper horizontal wing piece 409 of the longitudinal sash member 160, as shown in FIG. 140, to regulate the mounting position of the eaves-side upper portion. Also, the longitudinal opposite end faces of the lower horizontal sash member 150 are respectively brought into contact with the inner surfaces of the eaves-side ends of the confronting light-transmitting sheet support sash members 420, and the light-transmitting sheet press pieces 436 are fitted to the light-transmitting sheet insertion frame 415 of the light-transmitting sheet support sash member 420. Then, as shown in FIG. 141, the longitudinal opposite end faces of the upper horizontal sash member 170 are respectively brought into contact with the inner surfaces of the ridge-side ends of the light-transmitting sheet support sash members 420, so that the lower end of the fitting engagement piece 429 of the upper horizontal sash member 170 is made flush with the underside of the lower horizontal wing piece 406 of the longitudinal sash member 160. Then, as shown in FIGS. 147 and 148, the screw 437 is inserted into the eaves-side mounting hole 414 of the longitudinal sash member 160, the eaves-side fixing hole 428 of the light-transmitting sheet support sash member 420 and the hollow curved groove 435 of the lower horizontal sash member 150, and the screw 437 is also inserted into the ridge-side mounting hole 414 of the longitudinal sash member 160, the ridge-side fixing hole 428 of the light-transmitting sheet support sash member 420 and the hollow curved groove 426 of the upper horizontal sash member 170, so that a rectangular frame is constructed.

Also, the periphery of the light-transmitting sheet 180 is supported through packing by the light-transmitting sheet insertion frames 415 of the light-transmitting sheet support sash members 420, the light-transmitting sheet support groove 425 of the upper horizontal sash member 170 and the upside of the light-transmitting sheet mounting piece 430 of the lower horizontal sash member 150, and the eaves-side opposite end portions of the upside of the light-transmitting sheet 180 are pressed by the light-transmitting sheet press pieces 436, so that any projection is not formed at the eaves-side end of the upside of the light-transmitting sheet 180 between the light-transmitting sheet press pieces 436 to prevent the deposition of dust and the staying of snow or rain water.

Further, the light-transmitting sheet 180 is lengthened by extending the light-transmitting sheet 180 to the position of the light-transmitting sheet contact wall 431 of the lower horizontal sash member 150, so that the area of the light-transmitting sheet 180 is enlarged to improve the efficiency of collection of light of the lighting frames B.

In this case, since the eaves-side mounting hole 414 of the longitudinal sash member 160 is bored above the ridge-side mounting hole 414, the light-transmitting sheet support sash member 420 is mounted as being inclined upward to the eaves relative to the longitudinal sash member 160, as shown in FIGS. 145 and 146, and the lower horizontal sash member 150 is mounted above the upper horizontal sash member 170.

As shown in FIG. 149, when laying the light-transmitting frames B, each lower horizontal wing piece 406 of each longitudinal sash member 160 is brought into contact with the upside of one of the confronting projections 87 of each connecting member A or A', and the lower end of each vertical support leg 405 is inserted into the insertion groove 88 of each connecting member A or A' as being spaced apart from the bottom of the groove 88. Then, as shown in FIG. 150, the fitting engagement piece 429 of each upper horizontal sash member 170 is pressed by the fitting P mounted to the insertion groove 88, and each waterproof wall 410 of the longitudinal sash member 160 is inserted into the upper-part adjusting space 92' of each connecting member A or A', while a gap 410' is defined between the underside of the connecting member cover D and the upper end of the waterproof wall 410 in order to prevent capillary action.

Also, with the gap 410', hot air flowing from the underside of the lighting frames B through the exhaust notches 412 toward the connecting members A may be discharged to the outside.

In subsequence, another light-transmitting frame B is laid at the ridge side, and the horizontal piece 421 and the horizontal upper surface 423 of the upper horizontal sash member 170 of the light-transmitting frame B adjacent to the eaves-side light-transmitting frame are fitted to the recess 434 of the lower horizontal sash member 150 of another light-transmitting frame B at the ridge side. Then, the lighting frame fitting P is engaged with the fitting engagement piece 429 of the upper horizontal sash member 170 of the ridge-side light-transmitting frame B.

The light-transmitting frames B are successively roofed toward the ridge in the same manner.

The light-transmitting sheet 180 of the ridge-side lighting frame B is partially overlapped with the upside of the light-transmitting sheet 180 of the eaves-side lighting frame B through the upper horizontal sash member 170 and the lower horizontal sash member 150, and the light-transmitting sheet 180 is inclined at an angle smaller than the pitch of the sheathing roof board.

Namely, the lower edge of the vertical sash member 160 is mounted parallel to the sheathing roof board as long as the upper end of the upper horizontal sash member 170 of the light-transmitting frame B and the upside of the recess 434 of the lower horizontal sash member 150 are made flush with the lower edge of the longitudinal sash member, so that in the longitudinal sash member 160, the position of the eaves-side mounting hole 414 is made higher than that of the ridge-side mounting hole 414 such that the upper horizontal sash member 170 and the lower horizontal sash member 150 have the positional relationship as noted above.

As a result, as shown in FIGS. 151 and 152, the inclination of the light-transmitting sheet 180 to the longitudinal sash member 160 is made more steep the shorter the length of the light-transmitting frame B in the eaves-ridge direction is, whereas the inclination is made more gentle the longer the length thereof is. However, the relative inclination is easily varied by providing the longitudinal sash member 160 separately from the light-transmitting sheet support sash member 420.

We claim:

1. A roof mounted light transmitting frame comprising:
    a pair of longitudinal sash members;
    a pair of light-transmitting sheet support sash members each mounted along an inner surface of a respective one of said longitudinal sash members;
    a lower horizontal sash member having a vertically disposed support member mounted between front ends of said light-transmitting sheet support sash members;
    an upper horizontal sash member mounted between rear ends of said light-transmitting sheet support sash members; and
    a light-transmitting sheet mounted inside a space defined by said light-transmitting sheet support sash members, said upper horizontal sash member and said lower horizontal sash member;
    each said light-transmitting sheet support sash member being mounted obliquely to said longitudinal sash member such that a distance between the front end of said support sash member and a lower edge of said longitudinal sash member to which said support sash member is mounted is larger than a distance between the rear end of said support sash member and the lower edge of said longitudinal sash member; and
    a recess being longitudinally formed on said lower horizontal sash member adapted to receive said upper horizontal sash member.

2. A light transmitting frame according to claim 2, wherein said lower horizontal sash member has (i) a light-transmitting sheet contact wall having a height substantially equal to a thickness of the light-transmitting sheet, and (ii) a light-transmitting sheet mounting piece, and (iii) a light-transmitting sheet press piece disposed at each end of said light-transmitting sheet contact wall.

3. A light transmitting frame according to claim 2, wherein said vertical support member is J shaped.

4. A light transmitting frame according to claim 2, wherein each of said upper and lower horizontal sash members has at least one threaded portion adapted to receive a fastener for said mounting of said sash member.

5. A light transmitting frame according to claim 4, wherein each longitudinal sash member and each light transmitting sheet support sash member has at least one boring adapted to allow a threaded fastener to engage with said threaded portion.

6. A light transmitting frame according to claim 5, wherein the engagement of said threaded fastener causes the frame to be rectangular in shape.

7. A light transmitting frame according to claim 5, wherein each longitudinal sash member has one boring at each of a front end and a rear end of said longitudinal sash member and a distance between said front end boring and a lower edge of the longitudinal sash member is different than a distance between said rear end boring and said lower edge of the longitudinal sash member.

8. A light transmitting frame according to claim 7, wherein said the distance between said front end boring and said lower edge of the longitudinal sash member is larger than the distance between said rear end boring and said lower edge of the longitudinal sash member.

9. A light transmitting frame according to claim 2, wherein each of said light-transmitting sheet support member has a C or U shaped portion and said light-transmitting sheet is mounted on one end of said C or U shaped portion.

10. A light transmitting frame according to claim 2, wherein at least one of said longitudinal sash members includes a drain.

11. A light transmitting frame according to claim 10, wherein each of said longitudinal sash members has a vertical water proof portion disposed above said drain.

12. A light transmitting frame according to claim 10, wherein at least one said light-transmitting sheet support sash members has a drain.

13. A light transmitting frame according to claim 12, wherein said upper horizontal sash member includes a drain groove.

14. A light transmitting frame according to claim 13, wherein said lower horizontal sash member includes a waterproof gutter.

15. A light transmitting frame according to claim 2, wherein said upper horizontal sash member includes a flashing portion.

16. A light transmitting frame according to claim 15, wherein said flashing portion of said upper horizontal sash member forms a weather seal against said lower horizontal sash member.

17. A light transmitting frame according to claim 2, wherein the lower horizontal sash member has a J shaped portion and said J shaped portion forms the recess in the lower horizontal sash member.

18. A light transmitting frame according to claim 2, wherein each of said longitudinal sash members has a lower vertical portion adapted to fit in a groove of a support member.

19. A light transmitting frame according to claim 18, wherein said upper horizontal sash member is connected to said support member.

20. A light transmitting frame according to claim 2, wherein each of said longitudinal sash members has a lower vertical portion adapted to fit in a groove of a support member and a drain disposed above said lower vertical member.

\* \* \* \* \*